US012423943B2

United States Patent
Casey et al.

(10) Patent No.: US 12,423,943 B2
(45) Date of Patent: *Sep. 23, 2025

(54) VISIBLE LIGHT SENSOR CONFIGURED FOR GLARE DETECTION AND CONTROLLING MOTORIZED WINDOW TREATMENTS

(71) Applicant: Lutron Technology Company LLC, Coopersburg, PA (US)

(72) Inventors: Craig Alan Casey, Coopersburg, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,740

(22) Filed: Jan. 8, 2024

(65) Prior Publication Data

US 2024/0153234 A1    May 9, 2024

Related U.S. Application Data

(63) Continuation of application No. 17/879,113, filed on Aug. 2, 2022, now Pat. No. 11,900,650, which is a
(Continued)

(51) Int. Cl.
*G06V 10/60*    (2022.01)
*E06B 9/32*    (2006.01)
(Continued)

(52) U.S. Cl.
CPC ................ *G06V 10/60* (2022.01); *E06B 9/32* (2013.01); *E06B 9/68* (2013.01); *G05B 11/01* (2013.01);
(Continued)

(58) Field of Classification Search
CPC .. G06V 10/60; E06B 9/32; E06B 9/68; E06B 2009/6827; G05B 11/01; G06T 7/0002; G06T 7/73; G06T 7/97
See application file for complete search history.

(56) References Cited

U.S. PATENT DOCUMENTS 5,248,919 A    9/1993  Hanna et al.
7,391,297 B2   6/2008  Cash et al.
(Continued)

FOREIGN PATENT DOCUMENTS

CN    105432072 A      3/2016
JP    2016102399 A  *  6/2016
WO    2017100723 A1    6/2017

OTHER PUBLICATIONS

English Translation of "JP-2016102399-A" (Year: 2016).*
(Continued)

*Primary Examiner* — Charles R Kasenge
(74) *Attorney, Agent, or Firm* — Flaster Greenberg P.C.

(57) ABSTRACT

A sensor and/or system controller may process an image multiple times at multiple resolutions to detect glare conditions. A glare condition threshold used to determine whether a glare condition exists may be based on the resolution of the image. When the resolution of the image is higher, the glare condition threshold may be higher. The sensor and/or system controller may organize one or more adjacent pixels having similar intensities into pixel groups. The pixel groups may vary in size and/or shape. The sensor and/or system controller may determine a representative group luminance for the pixel group (e.g., an average luminance of the pixels in the group). The sensor and/or system controller may determine a group glare condition threshold, which may be used to determine whether a glare condition exists for the group of pixels and/or may be based on the size of the group.

51 Claims, 16 Drawing Sheets

Related U.S. Application Data continuation of application No. 17/111,000, filed on Dec. 3, 2020, now Pat. No. 11,435,704, which is a continuation of application No. 16/442,016, filed on Jun. 14, 2019, now Pat. No. 10,884,382.

(60) Provisional application No. 62/684,951, filed on Jun. 14, 2018.

(51) Int. Cl.
  *E06B 9/68* (2006.01)
  *G05B 11/01* (2006.01)
  *G06T 7/00* (2017.01)
  *G06T 7/73* (2017.01)

(52) U.S. Cl.
  CPC .............. *G06T 7/0002* (2013.01); *G06T 7/73* (2017.01); *G06T 7/97* (2017.01); *E06B 2009/6827* (2013.01)

(56) References Cited

U.S. PATENT DOCUMENTS

| | | |
|---|---|---|
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,288,981 B2 | 10/2012 | Zaharchuk et al. |
| 8,410,706 B2 | 4/2013 | Steiner et al. |
| 8,451,116 B2 | 5/2013 | Steiner et al. |
| 8,723,466 B2 | 5/2014 | Chambers et al. |
| 8,950,461 B2 | 2/2015 | Adams et al. |
| 9,488,000 B2 | 11/2016 | Kirby et al. |
| 9,538,603 B2 | 1/2017 | M et al. |
| 9,546,515 B2 | 1/2017 | Hall et al. |
| 9,679,696 B2 | 6/2017 | Bhutani et al. |
| 9,786,251 B1 | 10/2017 | Gordin et al. |
| 10,253,564 B2 | 4/2019 | Hebeisen et al. |
| 10,884,382 B2 | 1/2021 | Casey et al. |
| 11,435,704 B2 | 9/2022 | Casey et al. |
| 2008/0092075 A1 | 4/2008 | Jacob et al. |
| 2009/0206983 A1 | 8/2009 | Knode et al. |
| 2011/0075889 A1 | 3/2011 | Huang |
| 2013/0030589 A1 | 1/2013 | Pessina et al. |
| 2014/0156079 A1 | 6/2014 | Courtney et al. |
| 2014/0265568 A1 | 9/2014 | Crafts et al. |
| 2014/0375820 A1 | 12/2014 | Priyantha et al. |
| 2016/0056629 A1 | 2/2016 | Baker et al. |
| 2017/0171941 A1 | 6/2017 | Steiner et al. |
| 2018/0167547 A1 | 6/2018 | Casey et al. |
| 2018/0168015 A1 | 6/2018 | Casey et al. |
| 2018/0168019 A1 | 6/2018 | Baker et al. |
| 2018/0168020 A1 | 6/2018 | Casey et al. |
| 2018/0187484 A1 | 7/2018 | Hebeisen et al. |
| 2018/0252035 A1 | 9/2018 | Casey et al. |
| 2019/0384232 A1 | 12/2019 | Casey et al. |

OTHER PUBLICATIONS

Minz, P.S., et al., "Algorithm for automatic calibration of color vision system in foods", Journal of Food Measurement and Characterization (2018), Springer US, Boston, vol. 12, No. 3, Mar. 27, 2018 00:00:00.0, 8 pages.

* cited by examiner

VISIBLE LIGHT SENSOR CONFIGURED FOR GLARE DETECTION AND CONTROLLING MOTORIZED WINDOW TREATMENTS

CROSS-REFERENCE TO RELATED APPLICATIONS

This application is a continuation of U.S. Non-Provisional patent application Ser. No. 17/879,113, filed Aug. 2, 2022, which is a continuation of U.S. Non-Provisional patent application Ser. No. 17/111,000, filed on Dec. 3, 2020, which is a continuation of U.S. Non-Provisional patent application Ser. No. 16/442,016, filed on Jun. 14, 2019, which claims the benefit of U.S. Provisional Patent Application No. 62/684,951, filed Jun. 14, 2018, the entire disclosures of which are incorporated by reference herein.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. Occupancy sensors may include infrared (IR) sensors for detecting occupancy/vacancy of a space based on movement of the users. Daylight sensors may detect a daylight level received within a space. Color temperature sensor determines the color temperature within a user environment based on the wavelengths and/or frequencies of light. Temperature sensors may detect the current temperature of the space. Window sensors (e.g., glare sensors) may be positioned facing outside of a building (e.g., on a window or exterior of a building) to measure the total amount of natural light detected outside the building and/or detect glare conditions.

Some prior art load control systems have controlled motorized window treatments to prevent glare conditions inside of the building (e.g., glare conditions caused by direct sunlight shining into the building). The load control system may include a system controller for determining positions to which to control shade fabric of the motorized window treatments to prevent glare conditions based on the predicted location of the sun (e.g., using the present time of the day and year, the location and/or orientation of the building, etc.). The load control system may automatically control the motorized window treatments throughout the day according to the estimated positions of the sun. The load control system may also include window sensors that are configured to detect low light conditions (e.g., on cloudy days) and/or high light conditions (e.g., on extremely bright days) to enable the system controller to override the automatic control of the motorized window treatments on cloudy days and bright days. However, such load control systems require complicated configuration procedure and advanced system controller to operate appropriately. These systems are also performing estimation of daylight glare based on known conditions (e.g., the present time of the day and year, the location and/or orientation of the building, etc.) and/or a total amount of daylight sensed at the location of a given sensor. Examples of such a load control system is described in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

In certain situations, a glare condition may be detected outside of a building but may not result in a glare condition inside a building. For example, a glare condition may be detected outside the building but may not result in a glare condition inside when the size of the glare condition is small and the intensity of the glare condition is high. This type of glare condition may be considered "noise" and may result in a load control system unnecessarily and/or inaccurately controlling motorized window treatments. For example, such sources may be caused by reflections on small surfaces outside of a window, ripples in a body of water, and rain drops on the window. Accordingly, load control systems may filter this "noise" when detecting glare conditions and/or determining positions for motorized window treatments.

SUMMARY

A sensor (e.g., a visible light sensor) and/or a system controller may process an image to determine the position of a glare source and control motorized window treatments to prevent the glare source from affecting an occupant of a room. The sensor (e.g., a visible light sensor) and/or a system controller may process the pixels of the image to determine whether a glare condition exists. The sensor and/or system controller may compare the luminance of the pixels in the image to a glare condition threshold to determine whether a glare condition exists. For example, if the luminance of the pixel is greater than the glare condition threshold, the sensor and/or system controller may determine that a glare condition exists.

The visible light sensor may process the image to account for the small high-intensity glare conditions. For example, the visible light sensor may reduce the resolution of the image and/or group adjacent pixels having similar intensities into pixel groups. The sensor and/or system controller may process the image multiple times at multiple resolutions. The glare condition threshold used to determine whether a glare condition exists may be based on the resolution of the image. For example, when the resolution of the image is higher, the glare condition threshold may be higher. Similarly, when the resolution of the image is lower, the threshold may be lower.

The sensor and/or system controller may organize one or more adjacent pixels to form pixel groups. For example, the sensor and/or system controller may group pixels having similar intensities. The pixel groups may vary in size. The sensor and/or system controller may determine a representative group luminance, which may be a value that represents the luminance values of the pixels in the group. For example, the representative luminance value may be an average luminance of the pixels in the group. The sensor and/or system controller may determine a group glare condition threshold, which may be used to determine whether a glare condition exists for the group of pixels. For example, the sensor and/or system controller may determine the group glare condition threshold based on the size of the group. For example, a large pixel group may have a large group glare detection threshold.

After determining that a glare condition exists, the sensor and/or system controller may determine a profile angle for the glare source. The sensor and/or system controller may use the profile angle to identify the position to which a shade level may be controlled at one or more motorized window treatments to prevent the glare condition from affecting the occupant of the room.

As described herein, a sensor for detecting glare may comprise a visible light sensing circuit configured to record one or more images, and a control circuit configured to calculate a respective luminance of multiple pixels of an image (e.g., a non-warped image) and detect a glare condition in response to the luminance of at least one of the pixels. While calculating the respective luminance of each of the multiple pixels, the control circuit may be configured to start at a first pixel on a bottom row of pixels of the non-warped image and step through each of the multiple pixels on the bottom row before stepping up to a next row of pixels immediately above the bottom row. When the control circuit detects the glare condition, the control circuit may cease processing the non-warped image by not calculating the respective luminance of each of the remaining pixels of the non-warped image.

DETAILED DESCRIPTION

Figure 1:
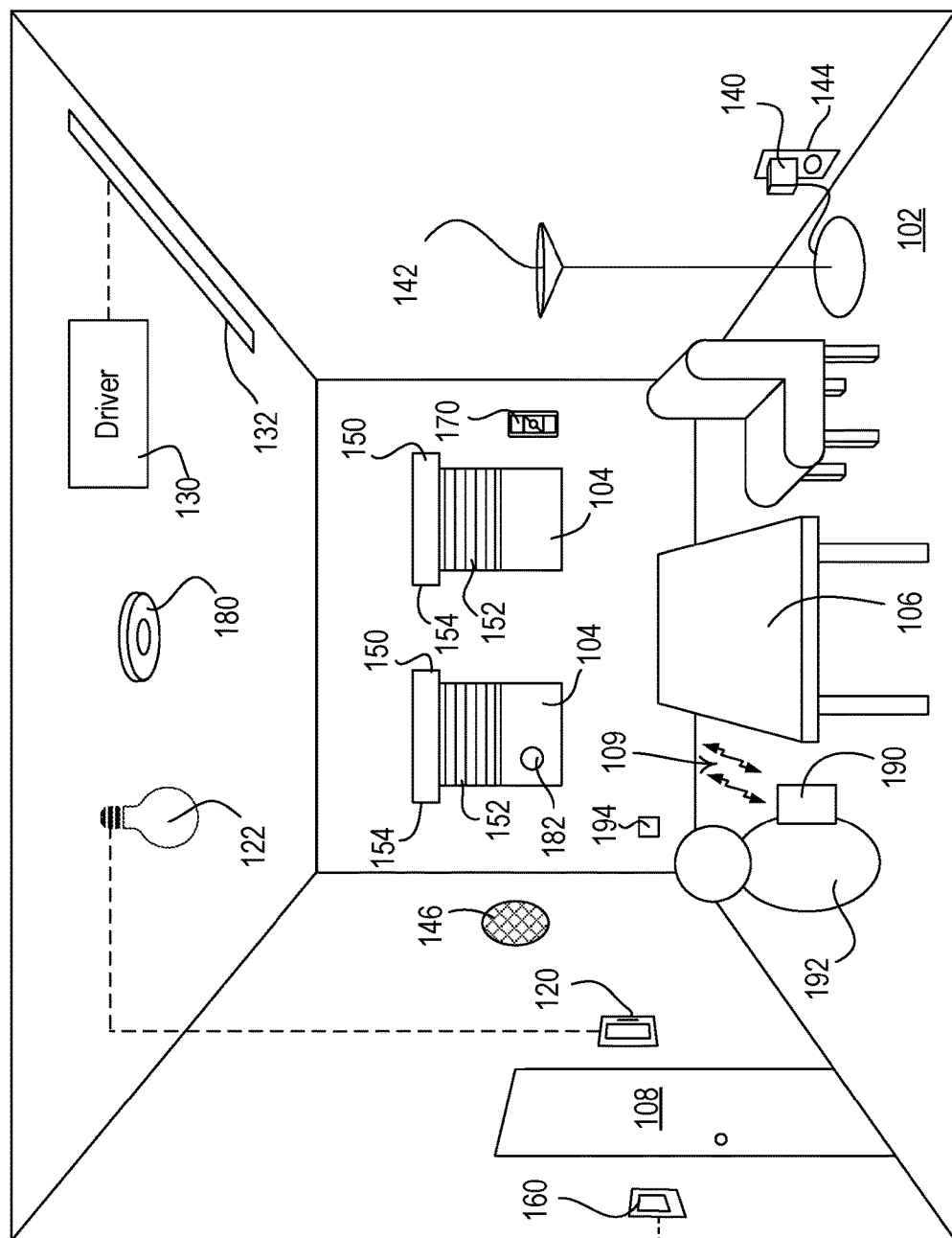
FIG. 1 is a diagram of an example load control system having visible light sensors.
Figure 1:
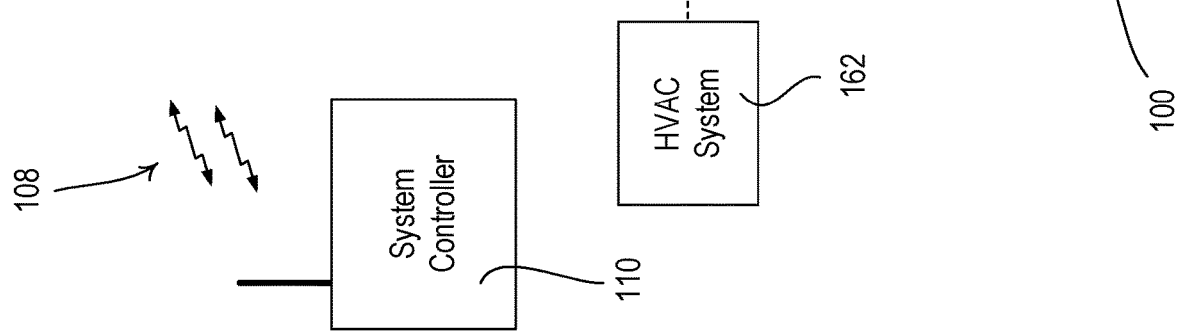

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Pat. No. 9,676,696, issued Jun. 13, 2017, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively or additionally, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170, a first visible light sensor 180 (e.g., a room sensor), and a second visible light sensor 182 (e.g., a window sensor). The input devices may be fixed or movable input devices. The system controller 110 may be configured to transmit one or more digital messages to the load control devices (e.g., the dimmer switch 120, the LED driver 130, the plug-in load control device 140, the motorized window treatments 150, and/or the thermostat 160) in response to the digital messages received from the remote control device 170 and the visible light sensors 180, 182. The remote control device 170 and the visible light sensors 180, 182 may be configured to transmit digital messages directly to the dimmer switch 120, the LED driver 130, the plug-in load control device 140, the motorized window treatments 150, and the temperature control device 160.

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 190 may be configured to transmit digital messages to the system controller 110, for example, in one or more Internet Protocol packets. For example, the mobile device 190 may be configured to transmit digital messages to the system controller 110 over the LAN and/or via the internet. The mobile device 190 may be configured to transmit digital messages over the internet to an external service (e.g., If This Then That (IFTTT®) service), and then the digital messages may be received by the system controller 110. The mobile device 190 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 190 may be configured to transmit RF signals according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 190 and/or the occupant 192. The system controller 110 may be configured to control (e.g., automatically control) the load control devices (e.g., the dimmer switch 120, the LED driver 130, the plug-in load control device 140, the motorized window treatments 150, and/or the temperature control device 160) in response to determining the location of the mobile device 190 and/or the occupant 192. One or more of the control devices of the load control system 100 may transmit beacon signals, for example, RF beacon signals transmitted using a short-range and/or low-power RF technology, such as Bluetooth technology. The load control system 100 may also comprise at least one beacon transmitting device 194 for transmitting the beacon signals. The mobile device 190 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 190. The mobile device 190 may be configured to transmit the unique identifier to the system controller 110, which may be configured to determine the location of the mobile device 190 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The visible light sensors 180, 182 may each comprise, for example, a camera and a fish-eye lens. The camera of the first visible light sensor 180 may be directed into the room 102 and may be configured to record images of the room 102. For example, the first visible light sensor 180 may be mounted to a ceiling of the room 102 (as shown in FIG. 1), and/or may be mounted to a wall of the room. If the first visible light sensor 180 is mounted to the ceiling, the images recorded by the camera may be top down views of the room 102. The camera of the second visible light sensor 182 may be directed outside of the room 102 (e.g., out of the window 104) and may be configured to record images from outside of the building. For example, the second visible light sensor 182 may be mounted to one of the windows 104 (as shown in FIG. 1), and/or may be mounted to the exterior of the building.

The visible light sensors 180, 182 may each be configured to process images recorded by the camera and transmit one or more messages (e.g., digital messages) to the load control devices in response to the processed images. Each visible light sensor 180, 182 may be configured to sense one or more environmental characteristics of a space (e.g., the room 102 and/or the room 200) from the images. For example, the first visible light sensor 180 may be configured to operate in one or more sensor modes (e.g., an occupancy and/or vacancy sensor mode, a daylight sensor mode, a color sensor mode, a glare detection sensor mode, an occupant count mode, etc.) In addition, the second visible light sensor 182 may be configured to operate in one or more same or different sensor modes (e.g., a color sensor mode, a glare detection sensor mode, a weather sensor mode, etc.) Each visible light sensor 180, 182 may execute different algorithms to process the images in each of the sensor modes to determine data to transmit to the load control devices. The visible light sensors 180, 182 may each transmit digital messages via the RF signals 108 (e.g., using the proprietary protocol) in response to the images. The visible light sensors 180, 182 may each send the digital messages directly to the load control devices and/or to the system controller 110, which may then communicate the messages to the load control devices. Each visible light sensor 180, 182 may comprise a first communication circuit for transmitting and receiving the RF signals 108 using the proprietary protocol.

The visible light sensors 180, 182 may each be configured to perform a plurality of sensor events to sense various environmental characteristics of the interior and/or the exterior of the room 102. For example, to perform a sensor event, each visible light sensor 180, 182 may be configured to operate in one of a plurality of sensor modes to execute one or more corresponding algorithms to sense the environmental characteristic. In addition, each visible light sensor 180, 182 may configured to obtain from memory certain preconfigured operational characteristics (e.g., sensitivity, baseline values, threshold values, limit values, etc.) that may be used by the algorithm to sense the environmental characteristic during the sensor event.

Further, each visible light sensor 180, 182 may be configured to focus on one or more regions of interest in the image recorded by the camera when processing the image to sense the environmental characteristic during the sensor event. For example, certain areas of the image recorded by the camera of one of the visible light sensors 180, 182 may be masked (e.g., digitally masked), such that the respective visible light sensor may not process the portions of the image in the masked areas. Each visible light sensor 180, 182 may be configured to apply a mask (e.g., a predetermined digital mask that may be stored in memory) to focus on a specific region of interest, and process the portion of the image in the region of interest. In addition, each visible light sensor 180, 182 may be configured to focus on multiple regions of interest in the image at the same time. Specific mask(s) may be defined for each sensor event.

The visible light sensors 180, 182 may each be configured to dynamically change between the sensor modes, apply digital masks to the images, and/or adjust operational characteristics depending upon the present sensor event. Each visible light sensor 180, 182 may be configured to perform a number of different sensor events to sense a plurality of the environmental characteristics of the space. For example, each visible light sensor 180, 182 may be configured to sequentially and/or periodically step through the sensor events to sense the plurality of the environmental characteristics of the space. Each sensor event may be characterized by a sensor mode (e.g., specifying an algorithm to use), one or more operational characteristics, and/or one or more digital masks. An example of a visible light sensor having multiple sensor modes is described in greater detail in commonly-assigned U.S. Patent Application Publication No. 2017/0171941, published Jun. 15, 2017, entitled LOAD CONTROL SYSTEM HAVING A VISIBLE LIGHT SENSOR, the entire disclosure of which is hereby incorporated by reference.

The first visible light sensor 180 may be configured to operate in the occupancy and/or vacancy sensor mode to determine an occupancy and/or vacancy condition in the room 102 in response to detection of movement within one or more regions of interest. The first visible light sensor 180 may be configured to use an occupancy and/or vacancy detection algorithm to determine that the room 102 is occupied in response to the amount of movement and/or the velocity of movement exceeding an occupancy threshold.

During a sensor event for detecting occupancy and/or vacancy, the first visible light sensor 180 may be configured to apply a predetermined mask to focus on one or more regions of interest in one or more images recorded by the camera and determine occupancy or vacancy of the space based on detecting or not detecting motion in the regions of interest. The first visible light sensor 180 may be responsive to movement in the regions of interest and not be responsive to movement in the masked-out areas. For example, the first visible light sensor 180 may be configured to apply a mask to an image of the room to exclude detection of motion in the doorway 108 and/or the windows 104 of the room 102, and may focus on a region of interest that includes the interior space of the room. The first visible light sensor 180 may be configured to apply a first mask to focus on a first region of interest, apply a second mask to focus on a second region of interest, and determine occupancy or vacancy based on movement detected in either of the regions of interest. In addition, the first visible light sensor 180 may be configured to focus on multiple regions of interest in the image at the same time by applying different masks to the image(s).

The first visible light sensor 180 may be configured to adjust certain operational characteristics (e.g., sensitivity) to be used by the occupancy and/or vacancy algorithm depending upon the present sensor event. The occupancy threshold may be dependent upon the sensitivity. For example, the first visible light sensor 180 may be configured to be more sensitive or less sensitive to movements in a first region of interest than in a second region of interest. For example, the first visible light sensor 180 may be configured to increase the sensitivity and apply a mask to focus on a region of interest around a keyboard of a computer to be more sensitive to movements around the keyboard. In other words, by using masks that focus on "smaller" vs "larger" (e.g., the keyboard vs. the desk surface on which the keyboard may sit), the first visible light sensor 180 may be configured to increase and/or decrease the sensitivity of detected or not detected movements. In addition, through the use of masks, the first visible light sensor 180 may be configured to not simply detect movement in the space, but detect where that movement occurred.

The first visible light sensor 180 may transmit digital messages to the system controller 110 via the RF signals 108 (e.g., using the proprietary protocol) in response to detecting the occupancy or vacancy conditions. The system controller 110 may be configured to turn the lighting loads (e.g., lighting load 122 and/or the LED light source 132) on and off in response to receiving an occupied command and a vacant command, respectively. Alternatively, the first visible light sensor 180 may transmit digital messages directly to the lighting loads. The first visible light sensor 180 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The first visible light sensor 180 may also be configured to operate in the daylight sensor mode to measure a light intensity at a location of the space. For example, the first visible light sensor 180 may apply a digital mask to focus on only a specific location in the space (e.g., on a task surface, such as a table 106 as shown in FIG. 1) and may use a daylighting algorithm to measure the light intensity at the location. For example, the first visible light sensor 180 may be configured to apply a mask to focus on a region of interest that includes the surface of a desk. The first visible light sensor 180 may be configured to integrate light intensities values of the pixels of the image across the region of interest to determine a measured light intensity at the surface of the desk.

The first visible light sensor 180 may transmit digital messages (e.g., including the measured light intensity) to the system controller 110 via the RF signals 108 for controlling the intensities of the lighting load 122 and/or the LED light source 132 in response to the measured light intensity. The first visible light sensor 180 may be configured to focus on multiple regions of interest in the image recorded by the camera and measure the light intensity in each of the different regions of interest. Alternatively, the first visible light sensor 180 may transmit digital messages directly to the lighting loads. The first visible light sensor 180 may be configured to adjust certain operational characteristics (e.g., gain) based on the region of interest in which the light intensity is presently being measured. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The system controller 110 may be configured to determine a degradation in the light output of one or more of the lighting loads (e.g., the lighting load 122 and/or the LED light source 132) in the space, and to control the intensities of the lighting loads to compensate for the degradation (e.g., lumen maintenance). For example, the system controller 110 may be configured to individually turn on each lighting load (e.g., when it is dark at night) and measure the magnitude of the light intensity at a location (e.g., on the table 106 or the desk 220). For example, the system controller 110 may be configured to turn on the lighting load 122 at night and control the first visible light sensor 180 to record an image of the room, to apply a mask to focus on a region of interest that the lighting load 122 illuminates (e.g., the surface of table 106 or the desk 220), to measure the light intensity in that region of interest, and to communicate that value to the system controller 110. The system controller 110 may store this value as a baseline value. At a time and/or date thereafter, the system controller 110 may repeat the measurement and compare the measurement to the baseline value. If the system controller 110 determines there to be a degradation, it may control the lighting load 122 to compensate for the degradation, alert maintenance, etc.

The first visible light sensor 180 may also be configured to operate in the color sensor mode to sense a color (e.g., measure a color temperature) of the light emitted by one or more of the lighting loads in the space (e.g., to operate as a color sensor and/or a color temperature sensor). For example, the first visible light sensor 180 may be configured to apply a mask to focus on a region of interest in the room 102 and may use a color sensing algorithm to determine a measured color and/or color temperature in the room. For example, the first visible light sensor 180 may integrate color values of the pixels of the image across the region of interest to determine the measured color and/or color temperature in the room. The first visible light sensor 180 may transmit digital messages (e.g., including the measured color temperature) to the system controller 110 via the RF signals 108 for controlling the color (e.g., the color temperatures) of the lighting load 122 and/or the LED light source 132 in response to the measured light intensity (e.g., color tuning of the light in the space). Alternatively, the first visible light sensor 180 may transmit digital messages directly to the lighting loads. An example of a load control system for controlling the color temperatures of one or more lighting loads is described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference.

The first visible light sensor 180 may be configured to operate in a glare detection sensor mode. For example, the first visible light sensor 180 may be configured execute a glare detection algorithm to determine a depth of direct sunlight penetration into the space from the image recorded by the camera. For example, the first visible light sensor 180 may be configured to apply a mask to focus on a region of interest on the floor of the room 102 near the windows 104 to sense the depth of direct sunlight penetration into the room. Based on a detection and/or measurement of the depth of direct sunlight penetration into the room, the first visible light sensor 180 may transmit digital messages to the system controller 110 via the RF signals 108 to limit the depth of direct sunlight penetration into the space, for example, to prevent direct sunlight from shining on a surface (e.g., a table or a desk). The system controller 110 may be configured to lower the window treatment fabric 152 of each of the motorized window treatments 150 to prevent the depth of direct sunlight penetration from exceeded a maximum sunlight penetration depth. Alternatively, the first visible light sensor 180 may be configured to directly control the window treatments 150 to lower of the window treatment fabric 152. Examples of methods for limiting the sunlight penetration depth in a space are described in greater detail in previously-referenced U.S. Pat. No. 8,288,981.

The first visible light sensor 180 may be configured to focus only on daylight entering the space through, for example, one or both of the windows 104 (e.g., to operate as a window sensor). The system controller 110 may be configured to control the lighting loads (e.g., the lighting load 122 and/or the LED light source 132) in response to the magnitude of the daylight entering the space. The system controller 110 may be configured to override automatic control of the motorized window treatments 150, for example, in response to determining that it is a cloudy day or an extremely sunny day. Alternatively, the first visible light sensor 180 may be configured to directly control the window treatments 150 to lower of the window treatment fabric 152. Examples of load control systems having window sensors are described in greater detail in commonly-assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The first visible light sensor 180 may be configured to detect a glare source (e.g., sunlight reflecting off of a surface) outside or inside the room 102 in response to the image recorded by the camera. The system controller 110 may be configured to lower the window treatment fabric 152 of each of the motorized window treatments 150 to eliminate the glare source. Alternatively, the first visible light sensor 180 may be configured to directly control the window treatments 150 to lower of the window treatment fabric 152 to eliminate the glare source.

The first visible light sensor 180 may also be configured to operate in the occupant count mode and may execute an occupant count algorithm to count the number of occupants a particular region of interest, and/or the number of occupants entering and/or exiting the region of interest. For example, the system controller 110 may be configured to control the HVAC system 162 in response to the number of occupants in the space. The system controller 110 may be configured to control one or more of the load control devices of the load control system 100 in response to the number of occupants in the space exceeding an occupancy number threshold. Alternatively, the first visible light sensor 180 may be configured to directly control the HVAC system 162 and other load control devices.

The second visible light sensor 182 may be configured to operate in a glare detection sensor mode. For example, the second visible light sensor 182 may be configured execute a glare detection algorithm to determine if a glare condition may exist in the room 102 from one or more images recorded by the camera. The glare condition in the room 102 may be generated by a glare source outside of the room, such as the sun, an external lamp (e.g., an outdoor building light or a streetlight), and/or a reflection of the sun or other bright light source. The second visible light sensor 182 may be configured to analyze one or more images recorded by the camera to determine if an absolute glare condition exists and/or a relative glare condition exists outside of the room 102 as viewed from one of the windows 104. An absolute glare condition may occur when the light level (e.g., the light intensity) of a potential glare source is too high (e.g., exceeds an absolute glare threshold). A relative glare condition (e.g., a contrast glare condition) may occur when the difference between the light level of a potential glare source and a background light level (e.g., a baseline) is too high (e.g., exceeds a relative glare threshold).

Based on a detection of a glare condition, the second visible light sensor 182 may transmit digital messages to the system controller 110 via the RF signals 108 to open, close, or adjust the position of the window treatment fabric 152 of each of the motorized window treatments 150. For example, the system controller 110 may be configured to lower the window treatment fabric 152 of each of the motorized window treatments 150 to prevent direct sunlight penetration onto a task surface in the room 102 (e.g., a desk or a table). If the second visible light sensor 182 does not detect a glare condition, the system controller 110 may be configured to open the motorized window treatments 150 (e.g., to control the position of the window treatment fabric 152 to a fully-open position or a visor position). Alternatively, the second visible light sensor 182 may be configured to directly control the window treatments 150.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the visible light sensor 180, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The operation of the visible light sensors 180, 182 may be programmed and configured using the mobile device 190 or other network device. Each visible light sensor 180, 182 may comprise a second communication circuit for transmitting and receiving the RF signals 109 (e.g., directly with the network device 190 using a standard protocol, such as Wi-Fi or Bluetooth). During the configuration procedure of the load control system 100, the visible light sensors 180, 182 may each be configured to record an image of the space and transmit the image to the network device 190 (e.g., directly to the network device via the RF signals 109 using the standard protocol). The network device 190 may display the image on the visual display and a user may configure the operation of each visible light sensor 180, 182 to set one or more configuration parameters (e.g., configuration information) of the visible light sensor. For example, for different environmental characteristics to be sensed and controlled by the visible light sensors 180, 182 (e.g., occupant movements, light level inside of the room, daylight level outside of the room), the user may indicate different regions of interest on the image by tracing (such as with a finger or stylus) masked areas on the image displayed on the visual display. The visible light sensors 180, 182 may each be configured to establish different masks and/or operational characteristics depending upon the environmental characteristic to be sensed (e.g., occupant movements, light level inside of the room, daylight level outside of the room, color temperature, etc.).

After configuration of the visible light sensors 180, 182 is completed at the network device 190, the network device may transmit configuration information to the visible light sensors (e.g., directly to the visible light sensors via the RF signals 109 using the standard protocol). The visible light sensors 180, 182 may each store the configuration information in memory, such that the visible light sensors may operate appropriately during normal operation. For example, for each sensor event the visible light sensors 180, 182 are to monitor, the network device 190 may transmit to the respective visible light sensor the sensor mode for the event, one or more masks defining regions of interest for the event, possibly an indication of the algorithm to be used to sense the environmental characteristic of the event, and one or more operational characteristics for the event.

While the load control system 100 of FIG. 1 has been described above with reference to two visible light sensors 180, 182, the load control system 100 could also simply include either one of the visible light sensors 180, 182. For example, the load control system 100 may not include the first visible light sensor 180 and may only include the second visible light sensor 182, which may be mounted to the window 104 and may operate to prevent sun glare from occurring on a task surface in the room 102. In addition, the load control system 100 may have more than two visible light sensors. Each window may have a respective visible light sensor, or a visible light sensor may receive an image through a window that is representative of a group of windows having motorized window treatments that are collectively controlled based on the image of a single visible light sensor.

Figure 2:
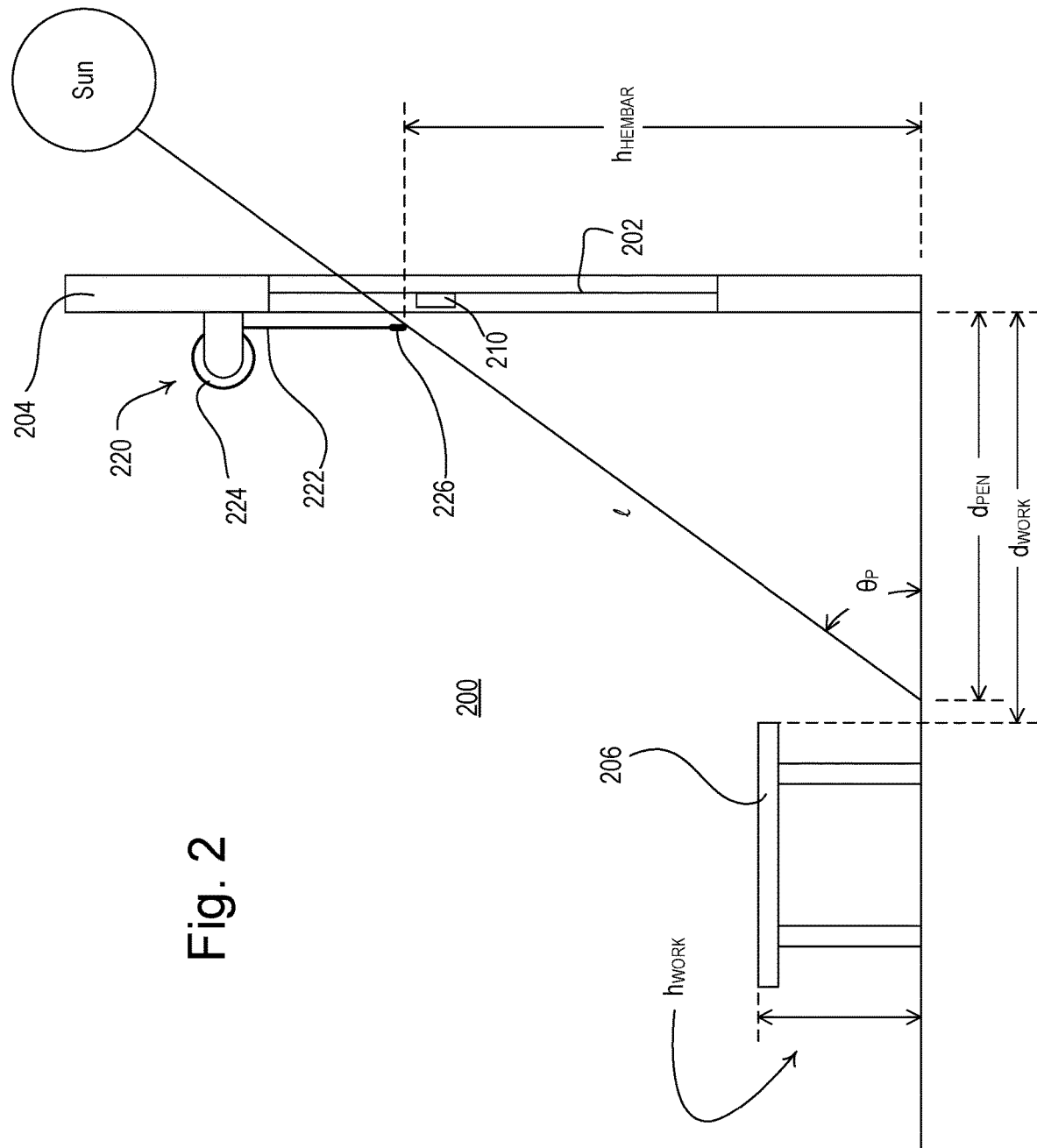
FIG. 2 is a side view of an example space having a visible light sensor.

FIG. 2 is a simplified side view of an example space 200 having a visible light sensor 210 (e.g., such as the second visible light sensor 182 of the load control system 100 shown in FIG. 1). The visible light sensor 210 may be mounted to a window 202, which may be located in a façade 204 of a building in which the space 200 is located and may allow light (e.g., sunlight) to enter the space. The visible light sensor 210 may be mounted to an inside surface of the window 202 (e.g., as shown in FIG. 2) or an outside surface of the window 202. The window 202 may be characterized by a height $h_{WIN-BOT}$ of the bottom of the window and a height $h_{WIN-TOP}$ of the top of the window. The space 200 may also comprise a work surface, e.g., a table 206, which may have a height $h_{WORK}$ and may be located at a distance $d_{WORK}$ from the window 202.

A motorized window treatment, such as a motorized roller shade 220 may be mounted over the window 202. The motorized roller shade 220 may comprise a roller tube 222 around which a shade fabric 224 may be wrapped. The shade fabric 224 may have a hembar 226 at the lower edge of the shade fabric that may be a height $h_{HEMBAR}$ above the floor. The motorized roller shade 220 may comprise a motor drive unit (not shown) that may be configured to rotate the roller tube 222 to move the shade fabric 224 between a fully-open position $P_{OPEN}$ (e.g., at which the window 202 is not covered and the hembar 226 may be at the top of the window) and a fully-closed position $P_{CLOSED}$ (e.g., at which the window 202 is fully covered and the hembar 226 may be at the bottom of the window). Further, the motor drive unit may control the position of the shade fabric 222 to one of a plurality of preset positions between the fully-open position and the fully-closed position.

A glare condition for an occupant of the room 200 may be caused by a glare source, such as the sun, an external lamp (e.g., an outdoor building light or a streetlight), or a reflection of the sun or other bright light source, that may be located outside of the window 202. For example, light from the glare source may shine through the window 202 into the room 200 and may extend into the room (e.g., onto the floor) for a penetration distance $d_{PEN}$ from the window 202 and/or from the façade 204. The penetration distance $d_{PEN}$ of the light may be measured in a direction normal to the window 202 and/or from the façade 204. The penetration distance $d_{PEN}$ of the light from the glare source may be a function of the height $h_{HEMBAR}$ of the hembar 226 of the motorized roller shade 220 and a profile angle $\theta_P$ of the glare source. The profile angle $\theta_P$ may represent the position of the glare source outside of the window 202. The position of the glare source may be defined by an altitude angle (e.g., a vertical angle) and an azimuth angle (e.g., a horizontal angle) from the center of view of the visible light sensor 210 (e.g., a direction perpendicular to the window 202 and/or the façade 204. The profile angle $\theta_P$ may be defined as an angle of a projection of the line from the glare source to the visible light sensor onto a vertical plane that is perpendicular to the window 202 and/or the façade 204. The penetration distance $d_{PEN}$ of light from the glare source onto the floor of the space 200 (e.g., in the direction normal to the window 202 and/or the façade 204) may be determined by considering a triangle formed by the penetration distance $d_{PEN}$, the height $h_{HEMBAR}$ of the hembar 226, and a length 1 of the light shining into the space 200 in the normal direction to the window 202, as shown in the side view of the window 202 in FIG. 2, e.g., $$\tan(\theta_P) = h_{HEMBAR}/d_{PEN}.$$ (Equation 1)

In response to the visible light sensor 210 detecting a glare source outside of the window 202, the visible light sensor 210 and/or a system controller (e.g., the system controller 110) may be configured to determine a position to which to control the shade fabric 224 (e.g., the hembar 226 of the shade fabric 224) of the motorized roller shade 220 to prevent a glare condition in the space. For example, the position of the hembar 226 of the motorized roller shade 220 may be adjusted to prevent the penetration distance $d_{PEN}$ from exceeding a maximum penetration distance $d_{PEN-MAX}$. For example, if the sun is shining in the window 220, the visible light sensor 210 may be configured to process the image to determine the profile angle $\theta s$ that defines the location of the glare source. The visible light sensor 210 and/or the system controller may be configured to calculate the desired height $h_{HEMBAR}$ above the floor to which to control the hembar 226 to prevent the light from the glare source from exceeding the maximum penetration distance $d_{PEN-MAX}$, e.g., $$h_{HEMBAR} = \tan(\theta_P) d_{PEN-MAX}. \quad \text{(Equation 2)}$$

The visible light sensor 210 and/or the system controller may be configured with values for the top and bottom heights $h_{WIN-TOP}$, $h_{WIN-BOT}$ of the window 220, e.g., during configuration of the visible light sensor and/or the system controller. The visible light sensor 210 and/or the system controller may be configured to determine a desired position of the hembar 226 between the fully-open position $P_{OPEN}$ and the fully-closed position $P_{CLOSED}$ of the motorized roller shade 220 using the top and bottom heights $h_{WIN-TOP}$, $h_{WIN-BOT}$ and the calculated height $h_{HEMBAR}$ of the hembar.

In addition, the position of the hembar 226 of the motorized roller shade 220 may be adjusted to prevent light from the glare source from shining on the table 206. For example, the visible light sensor 210 and/or the system controller may be configured to calculate the desired height $h_{HEMBAR}$ above the floor to which to control the hembar 226 to prevent the light from the glare source from shining on the table 206, e.g., $$h_{HEMBAR} = (\tan(\theta_P) \cdot d_{WORK}) + h_{WORK}. \quad \text{(Equation 3)}$$

The position of the hembar 226 of the motorized roller shade 220 may be adjusted to prevent light from the glare source from shining on in the eyes of occupants of the space 200. For example, the visible light sensor 210 and/or the system controller may be configured to calculate the desired height $h_{HEMBAR}$ above the floor to which to control the hembar 226 based on an estimated height of the occupant's eyes and/or an estimated distance of the occupants from the window. For example, if the room 200 includes a visible light sensor located within the room (e.g., as the visible light sensor 180 of the load control system 100 of FIG. 1), that visible light sensor may be configured to process an image of the room to determine the values for the height of the occupant's eyes and/or the distance of the occupants from the window.

The visible light sensor 210 and/or the system controller may store values for the maximum penetration distance $d_{PEN-MAX}$, the height $h_{WORK}$ of the table 206, and the distance $d_{WORK}$ of the table 206 from the window 202. For example, the visible light sensor 210 and/or the system controller may be configured with these values during the configuration of the visible light sensor 210 and/or the system controller (e.g., using the mobile device 190 or other network device). Additionally or alternatively, the visible light sensor 206 and/or the system controller may be configured with default values for the maximum penetration distance $d_{PEN-MAX}$, the height $h_{WORK}$ of the table 206, and the distance $d_{WORK}$ of the table 206 from the window 202. For example, if the room 200 includes a visible light sensor located within the room (e.g., as the visible light sensor 180 of the load control system 100 of FIG. 1), that visible light sensor may be configured to process an image of the room to determine the values for the maximum penetration distance $d_{PEN-MAX}$, the height $h_{WORK}$ of the table 206, and the distance $d_{WORK}$ of the table 206 from the window 202, and transmit those values to the visible light sensor 210 on the window 202 and/or the system controller.

Figure 3:
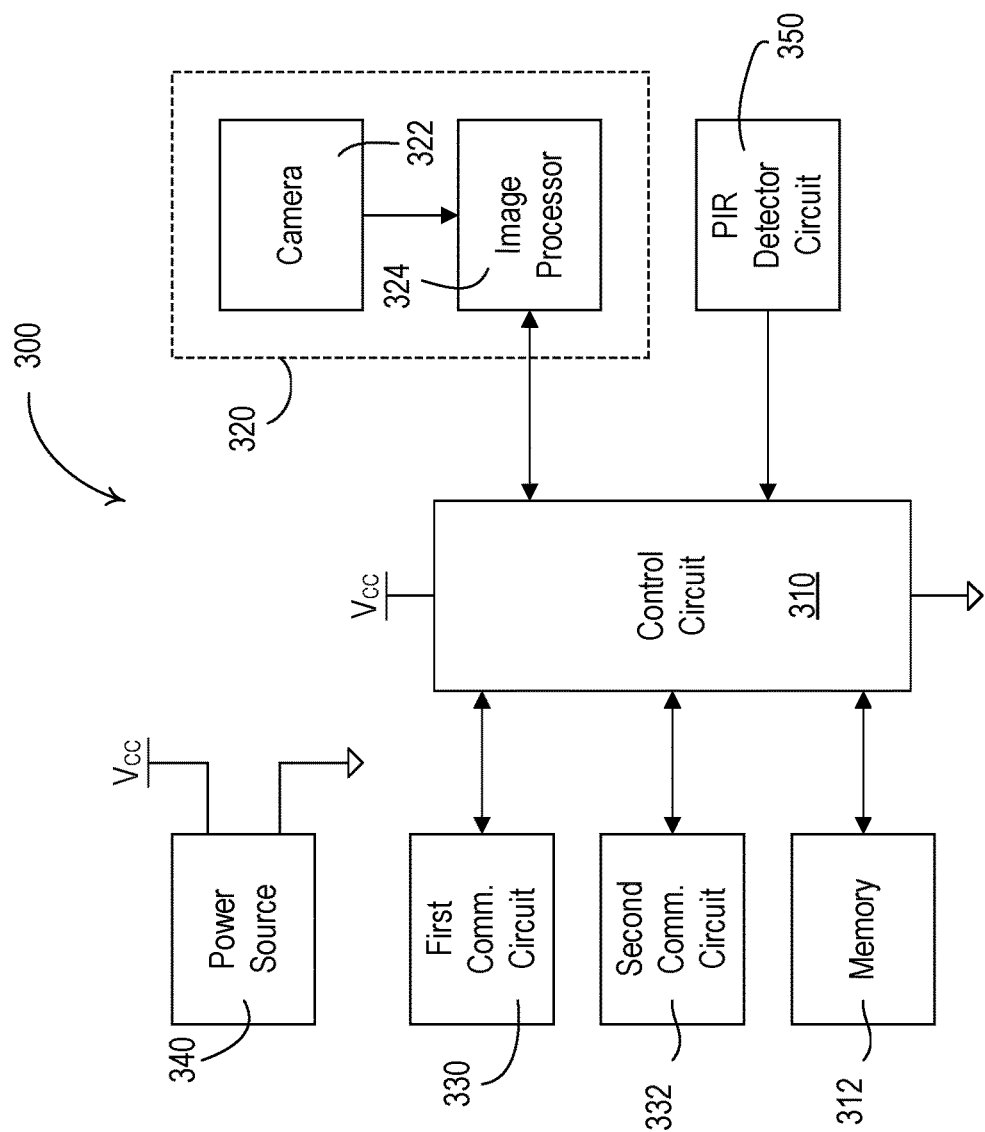
FIG. 3 is a block diagram of an example visible light sensor.

FIG. 3 is a simplified block diagram of an example visible light sensor 300, which may be deployed as one or both of the visible light sensors 180, 182 of the load control system 100 shown in FIG. 1 and/or the visible light sensor 210 of FIG. 2. The visible light sensor 300 may comprise a control circuit 310, for example, a microprocessor, a programmable logic device (PLD), a microcontroller, an application specific integrated circuit (ASIC), a field-programmable gate array (FPGA), or any suitable processing device. The control circuit 310 may be coupled to a memory 312 for storage of sensor events, masks, operational characteristics, etc. of the visible light sensor 300. The memory 312 may be implemented as an external integrated circuit (IC) or as an internal circuit of the control circuit 310.

The visible light sensor 300 may comprise a visible light sensing circuit 320 having an image recording circuit, such as a camera 322, and an image processing circuit, such as a processor 324. The image processor 324 may comprise a digital signal processor (DSP), a microprocessor, a programmable logic device (PLD), a microcontroller, an application specific integrated circuit (ASIC), a field-programmable gate array (FPGA), or any suitable processing device. The camera 322 may be positioned towards a space in which one or more environmental characteristics are to be sensed in a space (e.g., into the room 102). The camera 322 may be configured to capture or record an image. For example, the camera 322 may be configured to capture images at a particular sampling rate, where a single image may be referred to as a frame acquisition. One example frame acquisition rate is approximately ten frames per second. The frame acquisition rate may be limited to reduce the required processing power of the visible light sensor. Each image may consist of an array of pixels, where each pixel has one or more values associated with it. A raw RGB image may have three values for each pixel: one value for each of the red, green, and blue intensities, respectively. One implementation may use the existing RGB system for pixel colors, where each component of the intensity has a value from 0-255. For example, a red pixel would have an RGB value of (255, 0, 0), whereas a blue pixel would have an RGB value of (0, 0, 255). Any given pixel that is detected to be a combination of red, green, and/or blue may be some combination of (0-255, 0-255, 0-255). One will recognize that over representations for an image may be used.

The camera 322 may provide the captured image (e.g., a raw image) to the image processor 324. The image processor 324 may be configured to process the image and provide to the control circuit 310 one or more sense signals that are representative of the sensed environmental characteristics (e.g., an occurrence of movement, an amount of movement, a direction of movement, a velocity of movement, a counted number of occupants, a light intensity, a light color, an amount of direct sunlight penetration, etc.). For example, the one or more sense signals provided to the control circuit 310 may be representative of movement in the space and/or a measured light level in the space.

In addition, the image processor 324 may provide a raw image or a processed (e.g., preprocessed) image to the control circuit 310, which may be configured to process the image to determine sensed environmental characteristics. Regardless, the control circuit 310 may then use the sensed environmental characteristics to transmit control commands to load devices (e.g., directly or through system controller 110).

One example of a processed image, as is known in the art, is the luminance of a pixel, which may be measured from the image RGB by adding R, G, B intensity values, weighted according to the following formula:

$$\text{Luminance(perceived)} = (0.299 * R + 0.587 * G + 0.114 * B). \quad \text{(Equation 4)}$$

The example weighting coefficients may factor in the non-uniform response of the human eye to different wavelengths of light. However, other coefficients may alternatively be used.

As previously mentioned, if the visible light sensor 300 have a fish-eye lens, the image captured by the camera 322 may be warped. The image processor 324 may be configured to preprocess the image to de-warp the image and to generate a non-warped image.

Another image processing technique may include mapping the RGB sensor response to CIE tristimulus values to acquire chromaticity coordinates and thereby the Correlated Color Temperature (CCT). An example method is described by Joe Smith in the following reference: *Calculating Color Temperature and Illuminance using the TAOS TCS*3414*CS Digital Color Sensor, Intelligent Opto Sensor Designer's Notebook*, Feb. 27, 2009. Another example of a processed image may be an image to which a digital filter, or a digital mask has been applied. A digital mask may be used to eliminate regions within the image, which may not have value for further analysis and processing. Alternatively, a complement of a digital mask may be a region of interest (e.g., an area within an image that has been identified for further processing or analysis). A processed image may also be created via a technique known as background subtraction. For example, using background subtraction, a background image, which may incorporate the history of the image over time (e.g., the previous state of the room), may be subtracted from the current image (e.g., the current state of the room). This technique may identify differences in the images. Background subtraction may be useful for detecting movement in an image and for occupancy and vacancy detection. Various algorithms may be used for background maintenance, to determine how to effectively combine pixels over time into the background image. Some example background maintenance algorithms may include: adjusted frame difference, mean and threshold, mean and covariance, mixture of Gaussians, and normalized block correlation. These and other similar details inherent to image processing would be familiar to one skilled in the art.

The control circuit 310 and/or the image processor 324 may be configured to apply one or more masks to focus on one or more regions of interest in the image (e.g., the raw image and/or the preprocessed image) to sense one or more environmental characteristics of the space. As used herein, a mask may be any definition to define a region of interest of an image. For example, assuming an image may be defined as an N×M array of pixels where each pixel has a defined coordinate/position in the array, a mask be defined as a sequence of pixel coordinates that define the outer perimeter of a region of interest within the image. As another example, a mask may be defined as an N×M array that corresponds to the N×M array of pixels of an image. Each entry of the mask may be a 1 or 0, for example, whereby entries having a 1 may define the region of interest. Such a representation may allow an image array and a mask array to be "ANDED," which may cancel or zero out all pixels of the image that are not of interest. As another alternative, rather than a mask defining the region of interest of the image, a mask may define the region that is not of interest. These are merely examples and other representations may be used.

The visible light sensor 300 may comprise a first communication circuit 330 configured to transmit and receive digital messages via a first communication link using a first protocol. For example, the first communication link may comprise a wireless communication link and the first communication circuit 330 may comprise an RF transceiver coupled to an antenna. In addition, the first communication link may comprise a wired digital communication link and the first communication circuit 330 may comprise a wired communication circuit. The first protocol may comprise a proprietary protocol, such as, for example, the ClearConnect protocol. The control circuit 310 may be configured to transmit and receive digital messages via the first communication link during normal operation of the visible light sensor 300. The control circuit 310 may be configured to transmit an indication of the sensed environmental characteristic via the first communication link during normal operation of the visible light sensor 300. For example, the control circuit 310 may be configured to transmit an indication of a detected state (e.g., an occupancy or vacancy condition) and/or a measured environmental characteristic (e.g., a measured light level) via the first communication link during normal operation of the visible light sensor 300.

The visible light sensor 300 may comprise a second communication circuit 332 configured to transmit and receive digital messages via a second communication link using a second protocol. For example, the second communication link may comprise a wireless communication link and the second communication circuit 332 may comprise an RF transceiver coupled to an antenna. In addition, the second communication link may comprise a wired digital communication link and the second communication circuit 332 may comprise a wired communication circuit. The second protocol may comprise a standard protocol, such as, for example, the Wi-Fi protocol, the Bluetooth protocol, the Zigbee protocol, etc. The control circuit 310 may be configured to transmit and receive digital messages via the second communication link during configuration of the visible light sensor 300. For example, the control circuit 310 may be configured to transmit an image recorded by the camera 322 via the second communication link during configuration of the visible light sensor 300.

The visible light sensor 300 may comprise a power source 340 for producing a DC supply voltage $V_{CC}$ for powering the control circuit 310, the memory 312, the image processor 324, the first and second communication circuits 330, 332, and other low-voltage circuitry of the visible light sensor 300. The power source 340 may comprise a power supply configured to receive an external supply voltage from an external power source (e.g., an AC mains line voltage power source and/or an external DC power supply). In addition, the power source 340 may comprise a battery for powering the circuitry of the visible light sensor 300.

The visible light sensor 300 may further comprise a low-power occupancy sensing circuit, such as a passive infrared (PIR) detector circuit 350. The PIR detector circuit 350 may generate a PIR detect signal $V_{PIR}$ (e.g., a low-power occupancy signal) that is representative of an occupancy and/or vacancy condition in the space in response to detected passive infrared energy in the space. The PIR detector circuit 350 may consume less power than the visible light sensing circuit 320. However, the visible light sensing circuit 320 may be more accurate than the PIR detector circuit 350. For example, when the power source 340 is a battery, the control circuit 310 may be configured to disable the visible light sensing circuit 320 and use the PIR detector circuit 350 to detect occupancy conditions. The control circuit 310 may disable the light sensing circuit 320, for example, when the space is vacant. The control circuit 310 may detect an occupancy condition in the space in response to the PIR detect signal $V_{PIR}$ and may subsequently enable the visible light sensing circuit 320 to detect a continued occupancy condition and/or a vacancy condition. The control circuit 310 may enable the visible light sensing circuit 320 immediately after detecting an occupancy condition in the space in response to the PIR detect signal $V_{PIR}$. The control circuit 310 may also keep the visible light sensing circuit 320 disabled after detecting an occupancy condition in the space (in response to the PIR detect signal $V_{PIR}$). The control circuit 310 may keep the visible light sensing circuit 320 disabled until the PIR detect signal $V_{PIR}$ indicates that the space is vacant. The control circuit 310 may not make a determination that the space is vacant until the visible light sensing circuit 320 subsequently indicates that the space is vacant.

When the visible light sensor 300 is mounted to a window (e.g., as the second visible light sensor 182 of the load control system of FIG. 1), the control circuit 310 may be configured to record one or more images of the space outside of the window via the camera 322 and process the one or more images to determine if a glare condition exists. The visible light sensor 300 may comprise a fish-eye lens (not shown), which may cause the images recorded by the camera 322 to be warped. The control circuit 310 and/or the image processor 324 may be configured to de-warp the images recorded by the camera 322 to produce non-warped images, which may be characterized by rows of constant profile angle.

The control circuit 310 may be configured to process each pixel of the non-warped images to determine if a glare conditions exists for each pixel. The control circuit 310 may begin processing the image at a portion of the image which may be relative to a position on a window or group of windows from which the image is taken. For example, the portion of the image may represent a bottom portion of the window and the control circuit may begin processing the non-warped image at the bottom portion. The bottom portion may include a predefined number of pixel rows from the bottom of the image (e.g., a bottom row of pixels in the non-warped image). The control circuit may also, or alternatively, begin processing the image from a top portion (e.g., a top row of pixels) of the image. The portion of the image that is processed first may depend on the direction from which the motorized window treatment moves the covering material to close the covering material and/or the current position of the covering material to reduce the processing resources utilized to identify a glare condition in the image.

The control circuit 310 may be configured to start at the bottom row of pixels of the non-warped image (e.g., at the left or right side). The control circuit 310 may step through each pixel in the bottom row and process each pixel to determine if a glare condition exists before moving up to the next row. After the control circuit 310 determines that a glare condition exists, the control circuit 310 may stop processing the non-warped image and may operate to control one or more motorized window treatments (e.g., such as the motorized window treatments 140 of FIG. 1 and/or the motorized roller shade 220 of FIG. 2) to remove the glare condition (e.g., as will be described in greater detail below). This may prevent the rest of the image from being processed to detect the glare condition. If the control circuit 310 processes the entire image without detecting a glare condition, the control circuit may conclude that no glare conditions exist and may control the motorized window treatment to open. Since the control circuit 310 processes the pixels of the non-warped image starting at the bottom row of the non-warped image, the control circuit 310 may find the lowest pixel that indicates a glare source before detecting other higher glare sources. The lowest pixel that indicates a glare source is an important parameter for determining the shade position to which to control the motorized window treatments to prevent glare on the task surface. This allows allow the control circuit 310 to minimize the amount of processing that is needed to determine the shade control command to prevent glare in the room.

When processing the non-warped images to determine if a glare condition exists, the control circuit 310 may be configured to determine if an absolute glare condition exists and/or a relative glare condition (e.g., a contrast glare condition) exists. The control circuit 310 may be configured to determine that an absolute glare condition exists if the absolute light level (e.g., absolute intensity) of a pixel exceeds an absolute glare threshold (e.g., approximately 10,000 $cd/m^2$). The control circuit 310 may be configured to determine that a relative glare condition exists if the relative light level as compared to a background light level (e.g., the difference between the absolute light level of the pixel and a background light level) exceeds a relative glare threshold (e.g., approximately 4,000 $cd/m^2$). If the control circuit 310 detects that either an absolute glare condition exists or a relative glare condition exists, the control circuit may stop processing the non-warped image and move to control the motorized window treatment(s) to remove the glare condition. For example, the motorized window treatments(s) may remove the glare condition by determining a shade position based on the location of the glare condition. The thresholds may be adjustable to adjust a sensitivity of the visible light sensor 300. For example, the thresholds may be adjusted by a user during configuration of the visible light sensor 300.

To determine if a relative glare condition exists, the control circuit 310 may determine a background light level from the non-warped image (e.g., a baseline). The background light level may be a value representative of a luminance of the background of the non-warped image. For example, the background light level may be a percentile luminance of the non-warped image (e.g., a $25^{th}$ percentile luminance). The $25^{th}$ percentile luminance may be a luminance, where 25% of the pixels of the non-warped image are darker than the $25^{th}$ percentile luminance.

When the control circuit 310 has determined that a glare condition exists, the control circuit 310 may process the pixel to determine a profile angle of the glare source. For example, each pixel of the image may be characterized by a value of the profile angle. The values for the profile angle may be stored in the memory 312. The control circuit 310 may retrieve the appropriate profile angle based on the processed pixel. In addition, the profile angle may be determined and/or calculated from the data of the image. The control circuit 310 may determine a position to which to control the motorized window treatments using the profile angle (e.g., as shown in Equations 2 and/or 3 above). In addition, the control circuit 310 may transmit the profile angle to another device (e.g., the system controller 110), which may determine a position to which to control the motorized window treatments to avoid a glare condition in the room.

Figure 4:
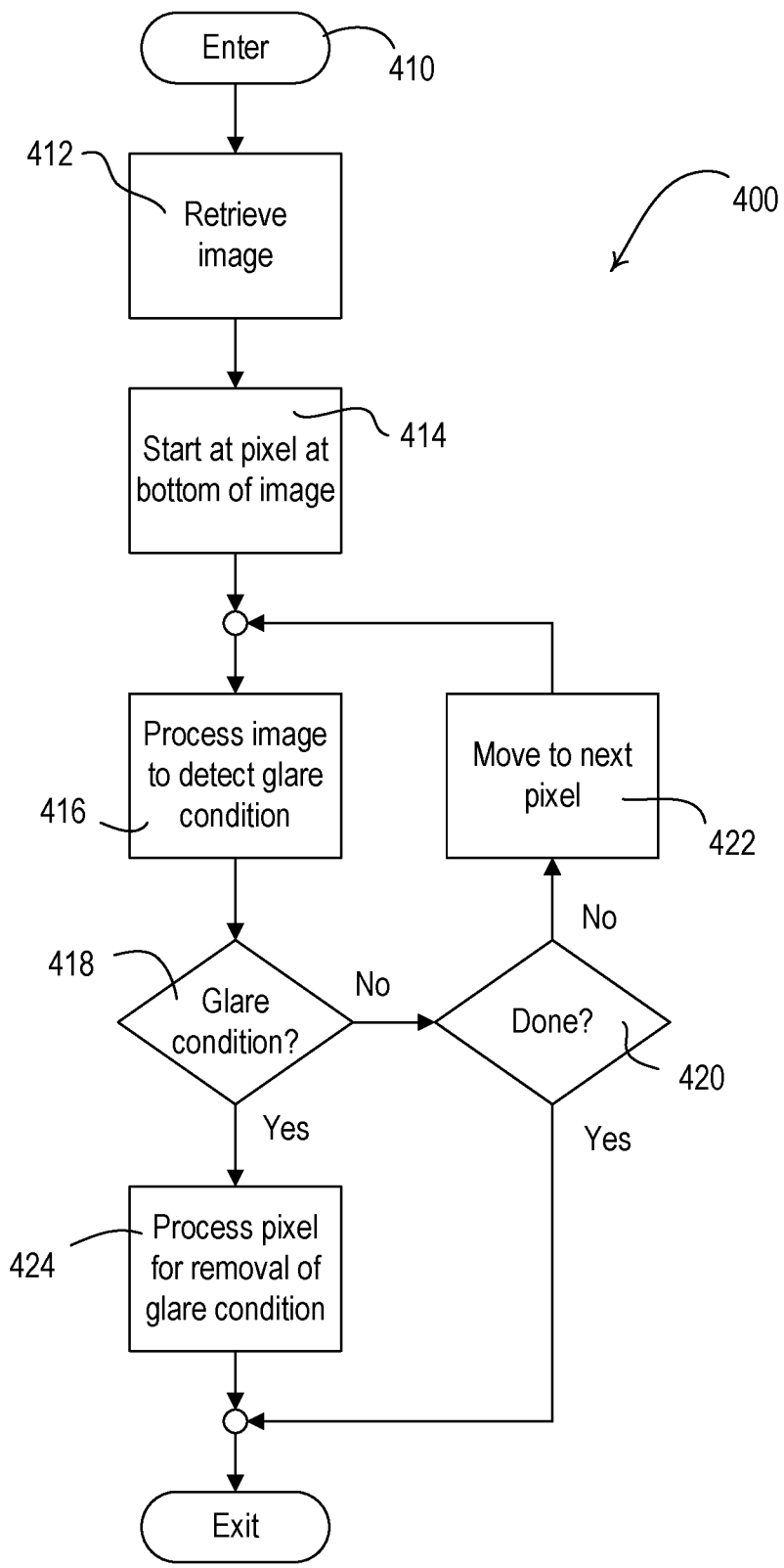
FIG. 4 shows a flowchart of an example glare detection procedure.

FIG. 4 is a simplified flowchart of an example glare detection procedure 400. The glare detection procedure 400 may be executed periodically by a control circuit of a visible light sensor (e.g., the control circuit 310 of the visible light sensor 300) at 410. At 412, the control circuit may retrieve an image (e.g., a non-warped image). For example, the control circuit may record one or more images and process the images to produce a non-warped image. Additionally or alternatively, the control circuit may retrieve one or more images (e.g., non-warped images) from memory at 412. At 414, the control circuit may begin processing a portion of the image. For example, the control circuit may begin processing the bottom portion of the image (e.g., the bottom row of pixels in the image). At 416, the control circuit may process a pixel of the image to determine if a glare condition (e.g., an absolute glare condition and/or a relative glare condition) exists. If the control circuit does not determine that a glare condition exists at 418 and the control circuit is not done processing the present image at 420, the control circuit may move to the next pixel at 422 and then process the next pixel at 416 to determine if a glare condition exists. If the control circuit determines that a glare condition exists at 418, the control circuit may process the present pixel at 424 to allow for control of a motorized window treatment to prevent the glare condition, before the procedure 400 exits. For example, the control circuit may determine a profile angle of the glare source in the image and/or determine a position to which to control the motorized window treatment to prevent the glare condition at 424. If the control circuit does not detect a glare condition before the control circuit is finished processing the image at 420, the procedure 400 may exit. Though the image processing may be described as being performed at the visible light sensor, the image processing may be performed at the system controller or another image processing device in the load control system.

Figure 5A:
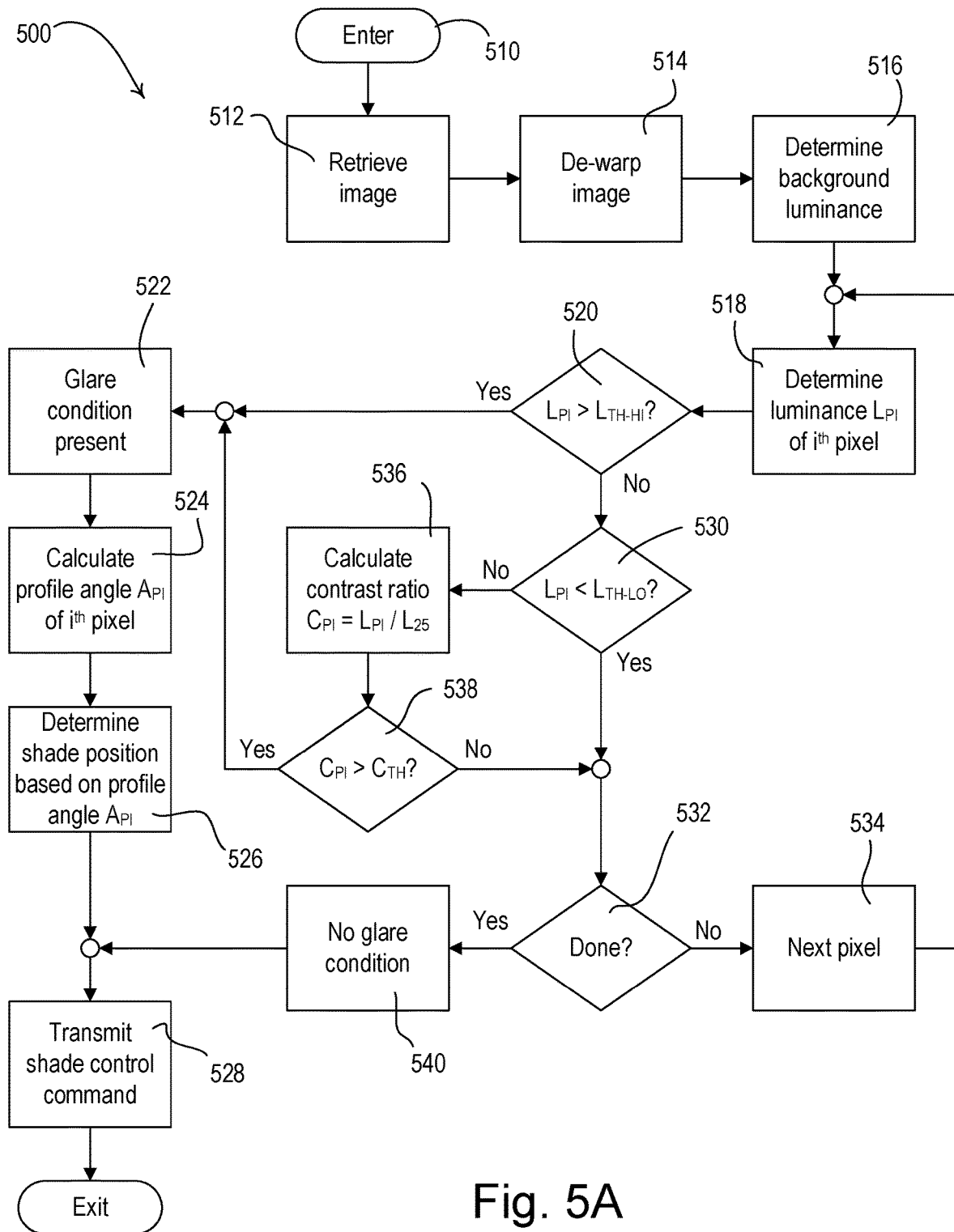
FIGS. 5A and 5B show flowcharts of example glare detection procedures that may be executed by a control circuit of a visible light sensor.

FIG. 5A shows a flowchart of an example glare detection procedure 500 executed periodically by a control circuit of a visible light sensor (e.g., the control circuit 210 of the visible light sensor 200) at 510. At 512, the control circuit may retrieve an image. For example, the image may comprise a high-dynamic-range (HDR) image, which may be a composite of multiple low-dynamic-range (LDR) images (e.g., six LDR images) recorded by a camera of the visible light sensor. At 514, the control circuit may de-warp the retrieved image (e.g., if the visible light sensor has a fish-eye lens) to produce a non-warped image. For example, to produce the non-warped image, the control circuit may generate rows of constant profile angle from the warped image. At 516, the control circuit may determine a background luminance for the non-warped image. For example, the control circuit may calculate a percentile luminance (e.g., a $25^{th}$ percentile luminance $L_{25}$), which may be a value representative of a luminance of the background of the non-warped image (e.g., a baseline).

At 518, the control circuit may determine the luminance $L_{PI}$ of the $i^{th}$ pixel of the non-warped image (from 514). For example, the control circuit may start at one of the pixels on the bottom row of the non-warped image (e.g., at the left or right side of the bottom row), the first time that 518 is executed. If the retrieved image is an HDR image, the control circuit may retrieve the luminance $L_{PI}$ of the $i^{th}$ pixel from the data of the HDR image at 518. The control circuit may also calculate the luminance $L_{PI}$ of the $i^{th}$ pixel (e.g., using Equation 4 shown above) at 518.

If the calculated luminance $L_{PI}$ is greater than a high luminance threshold $L_{TH-HI}$ (e.g., approximately 10,000 cd/m$^2$) at 520, the control circuit may determine that there is a glare condition present (e.g., an absolute glare condition) at 522. At 524, the control circuit may determine a profile angle Ari for the $i^{th}$ pixel (e.g., representing an approximate location of the glare source) using the row of the $i^{th}$ pixel from the non-warped image. For example, the control circuit may recall the profile angle Ari for the $i^{th}$ pixel from memory and/or may calculate the profile angle Ari using the data of the $i^{th}$ pixel and/or other pixels of the image.

At 526, the control circuit may determine a shade position for preventing light from the glare source from exceeding a maximum penetration distance and/or preventing glare on a task surface based on the profile angle Ari (e.g., using Equation 2 and/or Equation 3 shown above). The shade position for preventing light from the glare source from exceeding a maximum penetration distance and/or for preventing glare on the task surface may also be dependent upon the maximum penetration distance, a height of the task surface, and/or a distance of the task surface from the windows, which may be stored in memory. At 528, the control circuit may transmit a shade control command for controlling the position of motorized window treatments in the space to the determined shade position for preventing glare on the task surface (e.g., directly or via the system controller 110), before the glare detection procedure 500 exits. Alternatively, the control circuit may be configured to transmit the profile angle API to the system controller 110, which may determine the shade position for preventing glare on the task surface and transmit the shade control command to the motorized window treatments. Though the image processing may be described as being performed at the visible light sensor, the image processing may be performed at the system controller or another image processing device in the load control system.

If the calculated luminance $L_{PI}$ is not greater than the high luminance threshold $L_{TH-HI}$ at 520, the control circuit may be configured to determine if the calculated luminance Lin is less than a low luminance threshold $L_{TH-LO}$ (e.g., approximately 4,000 cd/m$^2$) at 530. If the calculated luminance $L_{PI}$ is less than the low luminance threshold $L_{TH-LO}$ at 530, the control circuit may decide not to process the $i^{th}$ pixel of the non-warped image. If the control circuit is not done processing the pixels of the non-warped image at 532, the control circuit may move onto the next pixel (e.g., i=i+1) at 534 and may calculate the luminance $L_{PI}$ of the next pixel of the non-warped image at 518. As previously mentioned, the control circuit may start at one of pixels on the bottom row of the non-warped image (e.g., at the left or right side of the bottom row). When the control circuit moves onto the next pixel at 534, the control circuit may move to the pixel adjacent to the previous pixel in the present row of pixels (e.g., to the left or the right of the previous pixel). When the control circuit has calculated the luminance for each pixel in a row, the control circuit may move up to the next row of pixels. In this way, the control circuit may step through multiple pixels in the non-warped image by starting at the bottom row and moving up through the rows of the image.

If the calculated luminance $L_{PI}$ is not less than the low luminance threshold $L_{TH-LO}$ at 530, the control circuit may calculate a contrast ratio $C_{PI}$ based on the calculated luminance $L_{PI}$ and the $25^{th}$ percentile luminance $L_{25}$ (e.g., $C_{PI}=L_{PI}/L_{25}$) at 536. If the contrast ratio $C_{PI}$ is greater than a contrast threshold $C_{TH}$ (e.g., approximately 15) at 538, the control circuit may determine that there is a glare condition present (e.g., a relative glare condition) at 522. The control circuit may then calculate a profile angle Ari for the $i^{th}$ pixel at 524, determine a shade position for preventing glare on the task surface based on the profile angle Ari at 526, and transmit a shade control command for controlling the position of motorized window treatments in the space at 528, before the glare detection procedure 500 exits. Alternatively, the control circuit may use the calculated luminance $L_{PI}$ of the $i^{th}$ pixel and the luminance of neighboring pixels (e.g., the lowest luminance of the neighboring pixels) at 538 to calculate the contrast ratio $C_{PI}$ at 536. For example, the neighboring pixels may be those pixels with a certain number of pixels from the $i^{th}$ pixel (e.g., all pixels within five pixels from the $i^{th}$ pixel).

When the control circuit has finished processing the pixels of the non-warped image at 532 without determining that a glare condition exists, the control circuit may determine that no glare condition exists at 540 and may transmit a shade control command for controlling the position of motorized window treatments at 528, before the glare detection procedure 500 exits. For example, if no glare condition exists, the control circuit may transmit a shade command for opening the motorized window treatments (e.g., to a fully-opened position or a visor position).

Figure 5B:
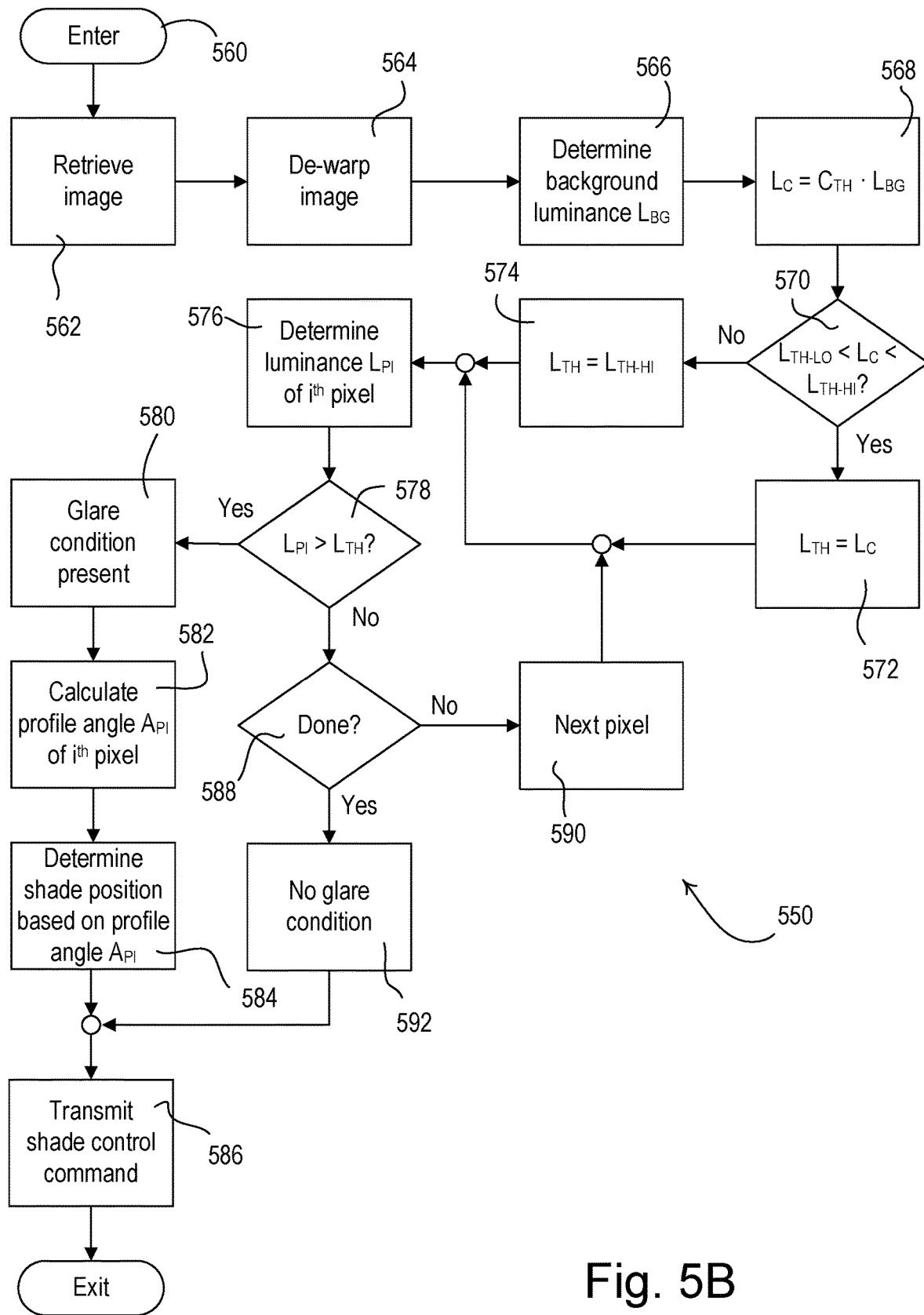

FIG. 5B shows a flowchart of another example glare detection procedure 550 executed periodically by a control circuit of a visible light sensor (e.g., the control circuit 210 of the visible light sensor 200) at 560. At 562, the control circuit may retrieve an image (e.g., an HDR image). At 564, the control circuit may de-warp the retrieved image (e.g., if the visible light sensor has a fish-eye lens) to produce a non-warped image (e.g., by generating rows of constant profile angle from the warped image). At 566, the control circuit may determine a background luminance $L_{BG}$ for the non-warped image. For example, the control circuit may calculate a percentile luminance (e.g., a $25^{th}$ percentile luminance $L_{25}$), which may be a value representative of a luminance of the background of the non-warped image (e.g., a baseline).

At 568, the control circuit may determine a contrast luminance $L_C$, which may represent the luminance of a glare source that may generate a contrast glare condition (e.g., a relative glare condition). For example, the control circuit may be configured to scale the background luminance $L_{BG}$ by a contrast threshold $C_{TH}$ (e.g., approximately 15) to generate the contrast luminance $L_C$, e.g., $L_C = C_{TH} L_{BG}$. If the contrast luminance $L_C$ is greater than a low luminance threshold $L_{TH-LO}$ (e.g., approximately 4,000 cd/m$^2$) and less than a high luminance threshold $L_{TH-HI}$ (e.g., approximately 10,000 cd/m$^2$) at 570, the control circuit may set a luminance threshold $L_{TH}$ equal to the contrast luminance $L_C$ at 572. Otherwise, the control circuit may set the luminance threshold $L_{TH}$ equal to the high luminance threshold $L_{TH-HI}$ at 574.

At 576, the control circuit may determine the luminance $L_{PI}$ of the i$^{th}$ pixel of the non-warped image (from 564) (e.g., by retrieving the luminance $L_{PI}$ from the data of an HDR image and/or calculating the luminance $L_{PI}$). For example, the control circuit may start at one of the pixels on the bottom row of the non-warped image (e.g., at the left or right side of the bottom row), the first time that 576 is executed. If the calculated luminance $L_{PI}$ is greater than the luminance threshold $L_{TH}$ at 578, the control circuit may determine that there is a glare condition present at 580. At 582, the control circuit may calculate a profile angle Ari for the i$^{th}$ pixel (e.g., representing an approximate location of the glare source) using the row of the i$^{th}$ pixel from the non-warped image. At 584, the control circuit may determine a shade position for preventing light from the glare source from exceeding a maximum penetration distance and/or preventing glare on a task surface based on the profile angle API (e.g., using Equation 2 and/or Equation 3 shown above). The shade position for preventing light from the glare source from exceeding a maximum penetration distance and/or for preventing glare on the task surface may be dependent upon the maximum penetration distance, a height of a task surface, and/or a distance of a task surface from the windows, which may be stored in memory. At 586, the control circuit may transmit a shade control command for controlling the position of motorized window treatments in the space to the determined shade position for preventing glare on the task surface (e.g., directly or via the system controller 110), before the glare detection procedure 550 exits. Alternatively, the control circuit may be configured to transmit the profile angle API to the system controller 110, which may determine the shade position for preventing glare on the task surface and transmit the shade control command to the motorized window treatments. Though the image processing may be described as being performed at the visible light sensor, the image processing may be performed at the system controller or another image processing device in the load control system.

If the control circuit is not done processing the pixels of the non-warped image at 588, the control circuit may move onto the next pixel (e.g., i=i+1) at 590 and may calculate the luminance $L_{PI}$ of the next pixel of the non-warped image at 576. As previously mentioned, the control circuit may start at one of pixels on the bottom row of the non-warped image (e.g., at the left or right side of the bottom row). When the control circuit moves onto the next pixel at 590, the control circuit may move to the pixel adjacent to the previous pixel in the present row of pixels (e.g., to the left or the right of the previous pixel). When the control circuit has calculated the luminance for each pixel in a row, the control circuit may move up to the next row of pixels. In this way, the control circuit may step through multiple pixels in the non-warped image by starting at the bottom row and moving up through the rows of the image.

When the control circuit has finished processing the pixels of the non-warped image at 588 without determining that a glare condition exists, the control circuit may determine that no glare condition exists at 592 and may transmit a shade control command for controlling the position of motorized window treatments at 586, before the glare detection procedure 550 exits. For example, if no glare condition exists, the control circuit may transmit a shade command for opening the motorized window treatments (e.g., to a fully-opened position or a visor position).

Figure 6:
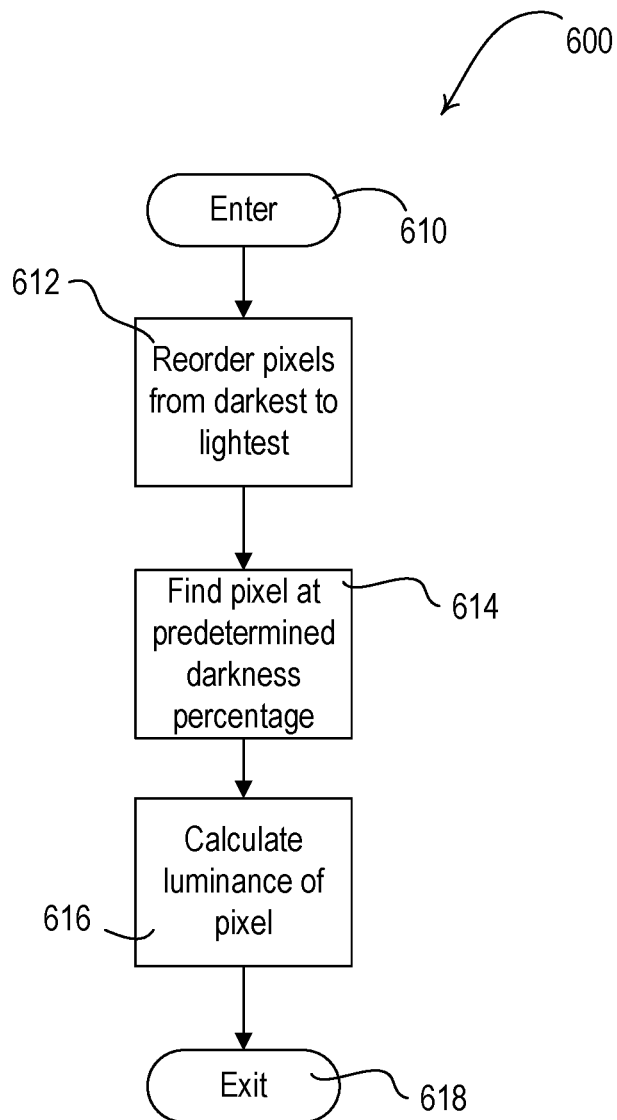
FIG. 6 shows a flowchart of an example procedure for determining a background luminance.

FIG. 6 is a simplified flowchart of a background luminance procedure 600. The background luminance procedure 600 may determine a value representative of a luminance of the background of an image (e.g., a non-warped image). The background luminance procedure 600 may be executed by a control circuit of a visible light sensor (e.g., the control circuit 310 of the visible light sensor 300), a system controller, or another image processing device at 610. For example, the background luminance procedure 600 may be executed at 516 of the glare detection procedure 500 shown in FIG. 5A and/or at 566 of the glare detection procedure 550 shown in FIG. 5B to calculate a $25^{th}$ percentile luminance $L_{25}$ of the non-warped image. At 612, the control circuit may reorder the pixels of the image in order from darkest to lightest. At 614, the control circuit may find the pixel that is a predetermined percentage (e.g., approximately 25%) of the way from the darkest pixel to the brightest pixel. For example, if the image has a total number $N_P$ of pixels, the control circuit may count through the reordered pixels (from darkest to brightest) until finding the pixel at number $N_{25}$, where $N^{25} = 0.25\ N_P$. At 616, the control circuit may calculate the luminance of the pixel (e.g., using the color of the pixel at number $N_{25}$) to determine the $25^{th}$ percentile luminance $L_{25}$. Alternatively, the control circuit may calculate the luminance of a different numbered pixel to set as the luminance of the background. The background luminance procedure 600 may exit at 618.

While the glare detection procedures 400, 500 of FIGS. 4 and 5 are described herein with the control circuit processing the non-warped image starting at the bottom portion (e.g., a bottom row) and working up through the rows of the image, the procedure may be reversed when the room 102 includes motorized window treatments that are bottom-up window treatments, e.g., the window treatment fabric moves from the bottom of the window to the top to cover the window. For example, when the motorized window treatments are bottom-up window treatments, the glare detection procedures 400, 500 may process the image starting at the top portion (e.g., a top row) and work down through the rows of the image, e.g., until a glare source is detected.

Figure 7A:
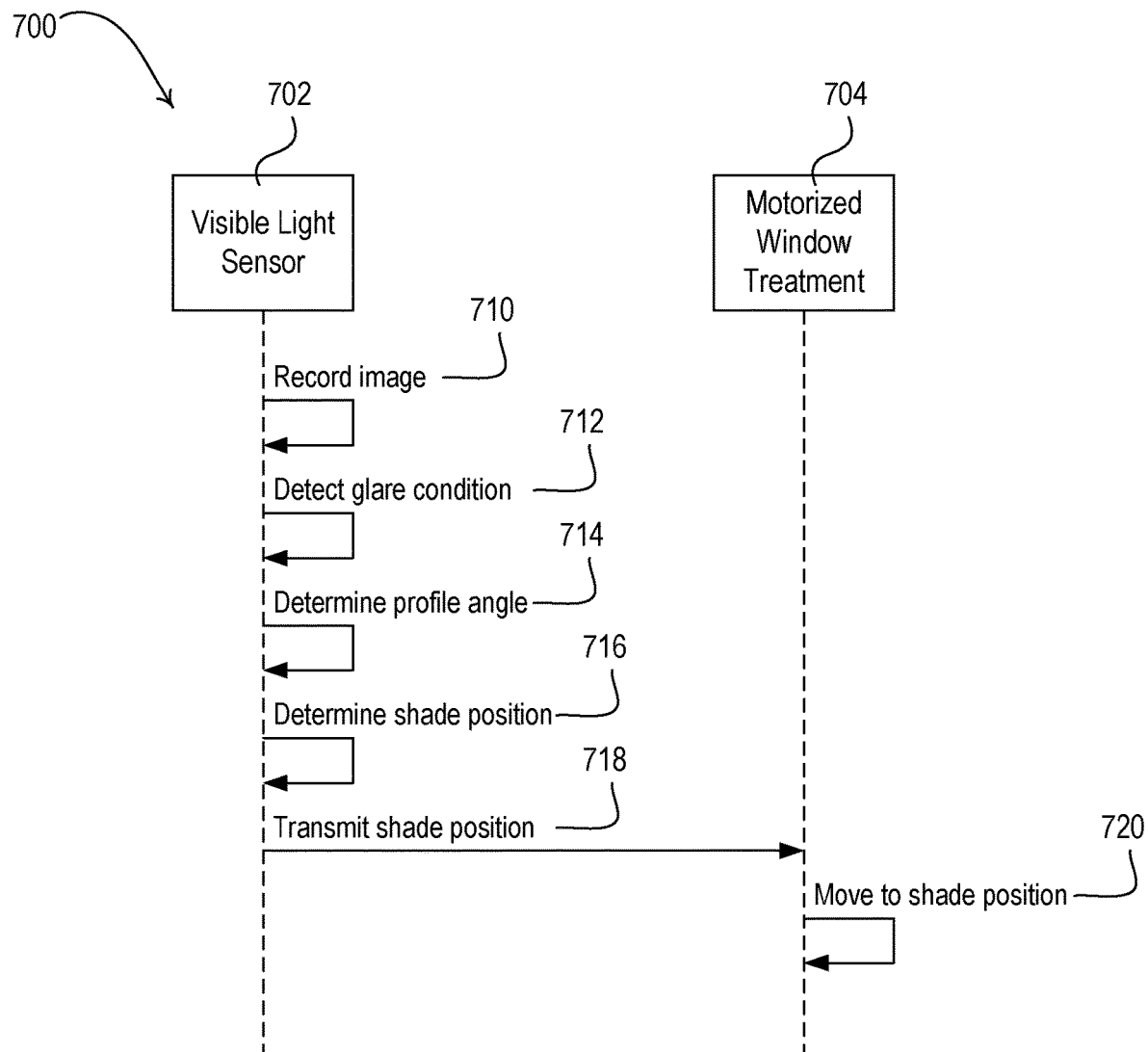
FIG. 7A shows a sequence diagram of an example glare detection procedure that may be executed by a visible light sensor and a motorized window treatment.

FIG. 7A is a sequence diagram of an example glare prevention procedure 700. As seen in FIG. 7A the glare prevention procedure 700 may be performed by a visible light sensor 702 (e.g., the visible light sensor 182, 300) and a motorized window treatment 704 (e.g., the motorized roller shade 220). At 710, the visible light sensor 702 may record an image of the outside of a room and/or building. At 712, the visible light sensor may process the image to detect a glare condition. For example, the detection of a glare condition may include calculating the luminance Lin of a pixel in the image and comparing them to luminance thresholds (e.g., 520, 522, 530, 536, and/or 538 of FIG. 5A).

If a glare condition is detected, the visible light sensor 702 may determine a profile angle of the glare condition at 714. As described herein, the profile angle may define the position of the glare source outside of a window (e.g., the window 202 in FIG. 2). The profile angle may be determined based on the location of the detected glare source (e.g., a pixel in the image recorded at 710). The visible light sensor 702 may comprise a lookup table to determine the profile angle. For example, the lookup table may provide an indication of the profile angle based on the location (e.g., a pixel in the image recorded at 710) of the detected glare source.

At 716, the visible light sensor 702 may determine the shade position for the motorized window treatment 704. The shade position may prevent a glare condition from affecting a room (e.g., the room 102 and/or the space 200). For example, the shade fabric may be positioned such that the shade fabric blocks light from the glare source represented by the pixel where the glare was detected. At 718, the shade position may be transmitted to the motorized window treatment 704. After receiving the shade position, the motorized window treatment may move the shade fabric to the indicated position at 720.

Figure 7B:
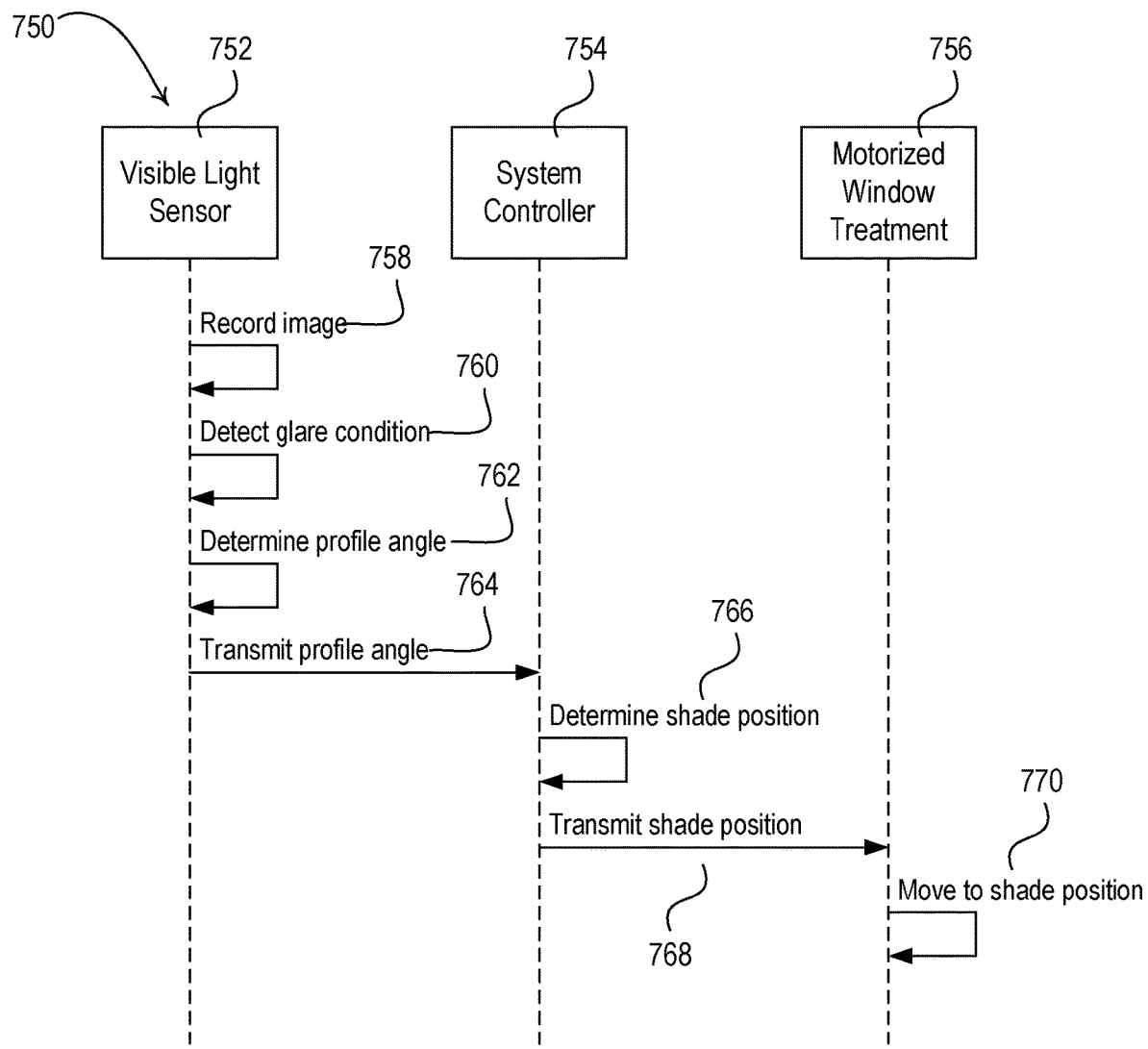
FIG. 7B shows a sequence diagram of an example glare detection procedure that may be executed by a visible light sensor, a system controller, and a motorized window treatment.

FIG. 7B is a sequence diagram of an example glare prevention procedure 750. As seen in FIG. 7B, the glare prevention procedure 750 may be performed by a visible light sensor 752 (e.g., the visible light sensor 182, 300), a system controller 754 (e.g., the system controller 110), and a motorized window treatment 756 (e.g., the motorized roller shade 220). At 758, the visible light sensor 752 may record an image of the outside of a room and/or building. At 760, the visible light sensor may process the image to detect a glare condition. For example, the detection of a glare condition may include calculating the luminance $L_{PI}$ of a pixel in the image and comparing them to luminance thresholds (e.g., 520, 522, 530, 536, and/or 538 of FIG. 5A).

If a glare condition is detected, the visible light sensor 752 may determine a profile angle of the glare condition at 762. As described herein, the profile angle may define the position of the glare source outside of a window (e.g., the window 202 in FIG. 2). The profile angle may be determined based on the location of the detected glare source (e.g., a pixel in the image recorded at 758). The visible light sensor 752 may comprise a lookup table to determine the profile angle. For example, the lookup table may provide an indication of the profile angle based on the location (e.g., a pixel in the image recorded at 758) of the detected glare source.

At 764, the visible light sensor 752 may transmit the profile angle to the system controller 754 (e.g., the system controller 110). At 766, the system controller 754 may determine a shade position for the motorized window treatment 756. For example, the shade fabric may be positioned such that the shade fabric blocks light from the glare source represented by the pixel where a glare was detected. At 768, the system controller 754 may transmit the shade position to the motorized window treatment 756. After receiving the shade position, the motorized window treatment may move the shade fabric to the indicated position at 770. Though the visible light sensor 752 is shown as processing the image, the system controller 754 may also, or alternatively, perform the image processing after the visible light sensor 752 generates the image.

Figure 8A:
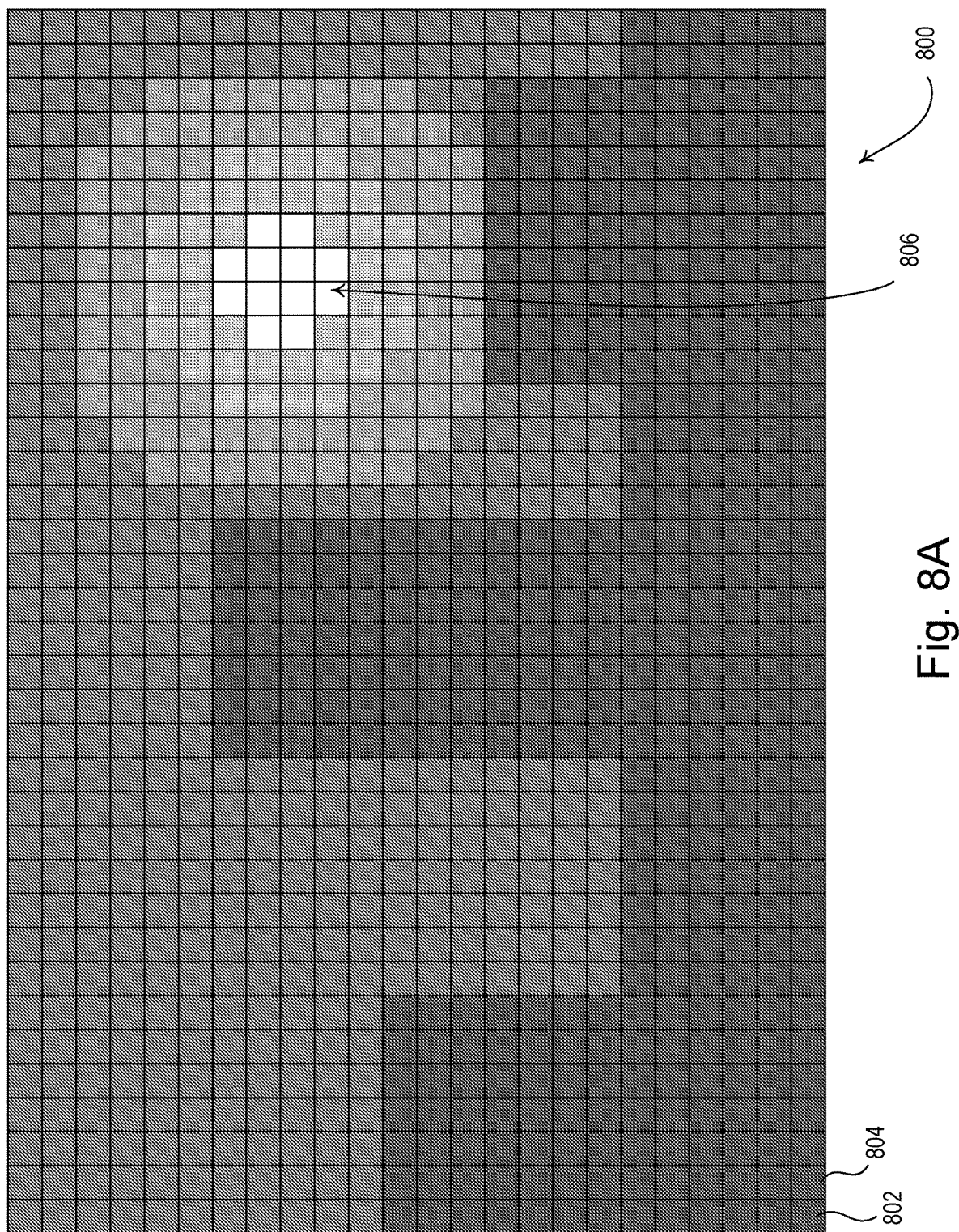
FIGS. 8A and 8B are examples of non-warped images used for glare detection.

FIG. 8A is a simplified example of a non-warped image 800 used to detect a glare condition. As seen in FIG. 8A, the image 800 may include one or more pixels (e.g., pixel 802, 804 and 806). The pixels may be organized in one or more pixel rows and/or one or more pixel columns. A visible light sensor (e.g., the visible light sensor 300) may retrieve the image 800 and process the image to determine if a glare condition exists. The visible light sensor may process the image to determine if a glare condition is present. This determination may include determining whether an absolute glare condition exist and/or a relative glare condition exists.

The visible light sensor may begin processing the first pixel in the bottom portion of the image 800. For example, the visible light sensor may begin processing the image 800 at pixel 802. The visible light sensor may determine the luminance of the pixel 802 to determine whether an absolute glare condition and/or a relative glare condition exists. If the visible light sensor determines that a glare condition (e.g., an absolute glare condition and/or a relative glare condition) does not exist, the visible light sensor may process the next pixel in the image (e.g., pixel 804).

The visible light sensor may continue processing the pixels in the image until the visible light sensor determines that a glare condition exists or finishes processing the image. For example, the visible light sensor may determine that a relative glare condition or an absolute glare condition exists at pixel 806 (e.g., the luminance of the pixel 806 is higher than a high luminance threshold or relative luminance threshold) and stop processing the image at pixel 806.

Figure 8B:
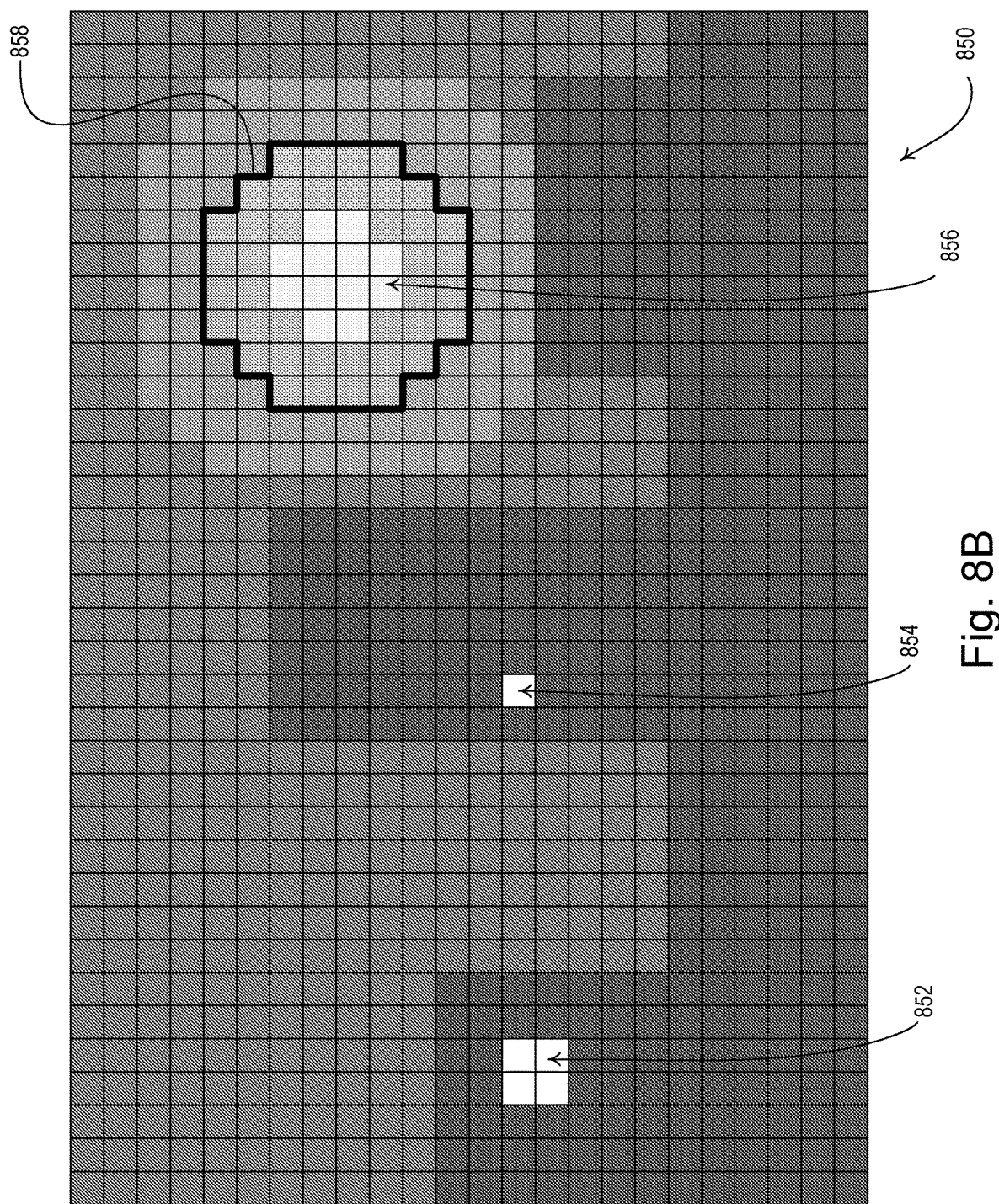

FIG. 8B is a simplified example of a non-warped image 850 used to detect a glare condition. The non-warped image 850 may be similar to the non-warped image 800. The non-warped image 850 may include one or more pixels that indicate a smaller glare source, but have a high intensity (e.g., pixels 852, 854). For example, the glare source indicated by pixels 852, 854 may be caused by reflections on small surfaces, ripples in a body of water, and/or rain drops on the window. Even though these pixels indicate a smaller glare source than other glare sources, such as the glare source indicated by pixels 856, the higher intensity (e.g., higher than an established threshold) may cause glare conditions to be incorrectly detected. The visible light sensor may process the image to account for the smaller high-intensity glare conditions. For example, the visible light sensor may reduce the resolution of the image and/or group adjacent pixels having similar intensities into pixel groups. Reducing the resolution of the image and/or grouping pixels with similar intensities into pixel groups may allow the visible light sensor adjust glare condition thresholds to perform improved glare condition detection (e.g., by adjusting glare condition thresholds based on the size of a pixel group and/or the resolution of an image). Other techniques may be used to account for small but high intensity glare sources.

Figure 9A:
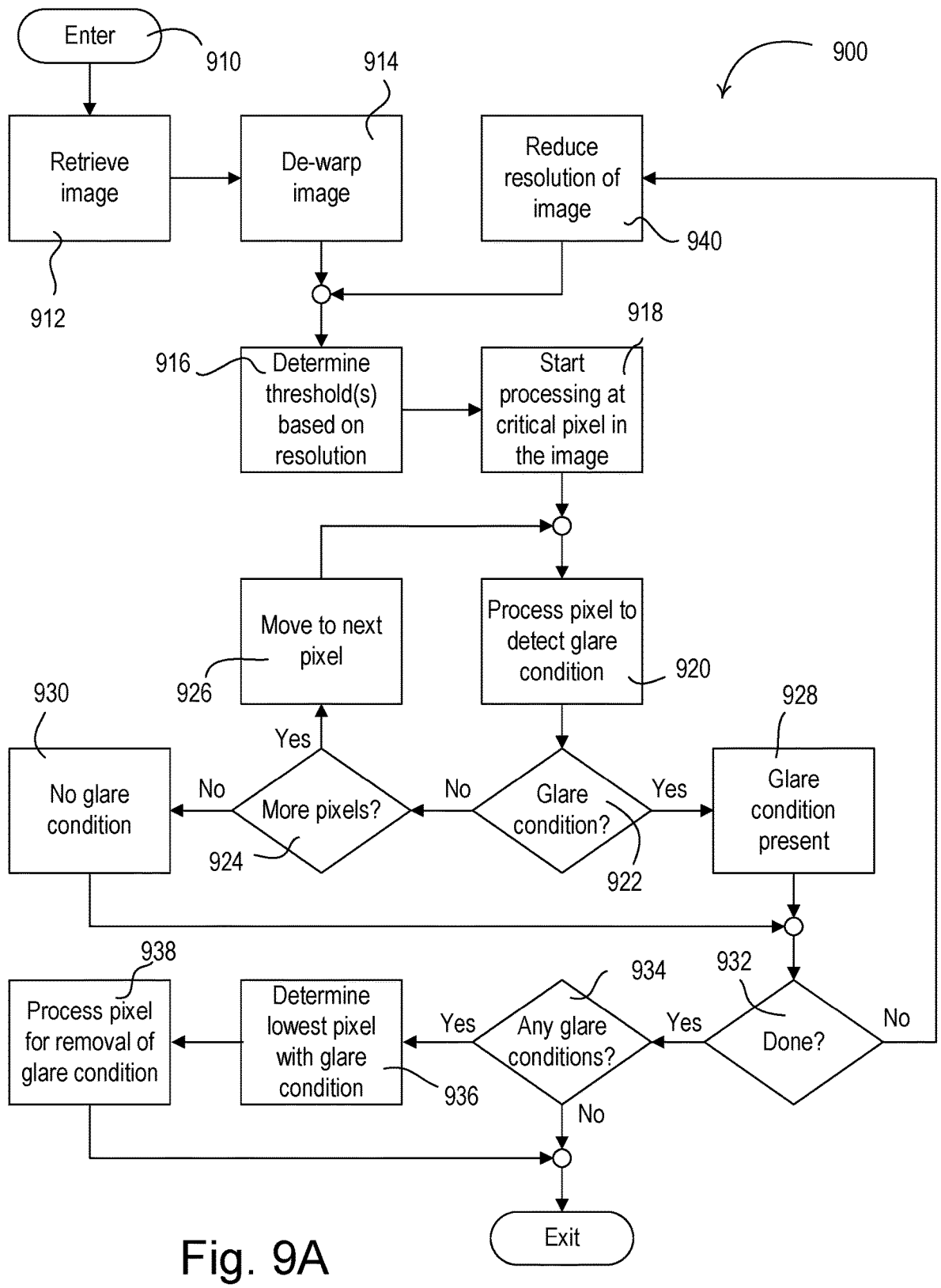
FIGS. 9A and 9B shows flowcharts of example procedures for detecting glare conditions.

FIG. 9A shows a flowchart of another example glare detection procedure 900. The procedure 900 may be executed periodically by a control circuit of a visible light sensor (e.g., the control circuit 210 of the visible light sensor 200) and/or a system controller (e.g., system controller 110). The procedure 900 may begin at 910. At 912, the control circuit of the visible light sensor or the system controller may retrieve an image. For example, the image may be retrieved from: the image capturing circuit of the visible light sensor (e.g., the image capturing circuit 320), the memory of the visible light sensor (e.g., memory 312), and/or another device (e.g., system controller 110). The image may be captured at an initial resolution and later converted to other resolutions, which may be lower than the initial resolution of the captured image. For example, the image may be captured at an initial resolution that may be a high resolution image, which may include approximately one million pixels (e.g., a one megapixel image or a 1280× 1024 image).

The device capturing the image (e.g., the image capturing circuit 320) may include a fisheye lens, which may cause the image captured to be curved and/or the perspective of the image to be distorted. Accordingly, at 914, the control circuit or the system controller may de-warp the image retrieved at 912, which may correct the curvature and/or perspective of the image. At 916, the control circuit of the visible light sensor or the system controller may determine one or more glare conditions thresholds (e.g., an absolute glare condition threshold and/or a relative glare condition threshold) based on the resolution of the image. For example, when the resolution of the image is higher, in which the size of the individual pixels are smaller, the threshold may be higher. When the resolution is lower, in which the size of the individual pixels are larger, the threshold may be lower. For example, the threshold may be approximately 25,000 candelas per square meter for a high resolution image (e.g., a one megapixel image), and approximately 5,000 candelas per square meter for a low resolution image (e.g., a 200×200 image).

At 918, the control circuit of the visible light sensor or the system controller may begin processing a first pixel in the image. For example, the pixel may be located at a predetermined location in the image, such as a bottom portion (e.g., a bottom row of pixels) or top portion (e.g., a top row of pixels) of the image. The control circuit of the visible light sensor may begin processing the image at a pixel that is located at a bottom right-hand corner or a bottom left-hand corner of the image for shades that lower from and raise to a window treatment mounted at the top of the window. The control circuit of the visible light sensor may begin analyzing a pixel in the image that is located at a top right-hand corner or a top left-hand corner of the image for shades that raise from and lower to a motorized window treatment mounted at the bottom of the window. The direction of the analysis may depend on the location the motorized window treatment is mounted and/or the location at which a critical glare condition (e.g., a highest glare condition or a lowest glare condition) is expected to be detected for controlling the motorized window treatments to reduce processing resources for processing images.

At 920, the control circuit of the visible light sensor or the system controller may process the pixel to attempt to detect a glare condition. The image processing may be similar to (e.g., may include) the steps performed in the example procedures 400, 500, and/or 550. For example, the control circuit of the visible light sensor or system controller may determine a luminance of the pixel and compare the luminance to the threshold determined at 916. If, at 922, a glare condition is not present (e.g., the luminance of the pixel is less than the threshold determined at 916), the control circuit may determine if there are additional pixels to process at 924. If there are additional pixels to process, the control circuit may move to a next pixel at 926 and process the next pixel to attempt to detect a glare condition. The next pixel may be the next pixel in the row, or a first pixel in the next row of the image. If there are not additional pixels to process, the control circuit may determine that a glare condition is not present in the image at 930.

If, at 922, the control circuit detects a glare condition (e.g., the pixel's luminance is greater than the threshold determined at 916), the control circuit may track and/or store the location of the glare condition (e.g., the location of the pixel) at 928. The location of the glare condition may be used to determine a shade position and/or a critical glare condition. The critical glare condition may be the highest or lowest glare condition detected in the image. The critical glare condition may be the lowest glare condition in the image for shades that lower from and raise to a window treatment mounted at the top of the window. The critical glare condition may be the highest glare condition in the image for shades that raise from and lower to a motorized window treatment mounted at the bottom of the window.

At 932, the control circuit of the visible light sensor or system controller may determine whether the image is done being processed. For example, the control circuit may process the image multiple times (e.g., three times) at multiple resolutions to detect different glare conditions using different thresholds that correspond to each resolution. The processing of different resolution images may allow the control circuit to appropriately detect glare conditions due to small high-intensity glare sources and/or large low-intensity glare sources. For example, small glare sources may be more easily detected in a higher resolution image because there are more pixels in the image. Since glare conditions may be caused due to a small glare source having a high intensity, the threshold used to detect the glare conditions in a high resolution image (e.g., as determined at 916) may be higher (e.g., a higher pixel intensity may trigger the detection of a glare condition). The small glare sources may be less easily detected in a lower resolution images (e.g., the small glare sources may be removed from and/or filtered out of the lower resolution image), which may allow a large low intensity glare source to be detected. Since glare conditions may also be caused due to a large glare source having a low intensity, the threshold used to detect the glare conditions in a low resolution image (e.g., as determined at 916) may be lower (e.g., a lower pixel intensity may trigger the detection of a glare condition).

If the control circuit determines that the image is not done being processed (e.g., a predetermined number of resolutions have yet to be processed), the control circuit may reduce resolution of the image at 940. As described herein, the control circuit may reduce the image resolution itself and process the different resolutions separately. Reducing the resolution of an image may reduce the number of pixels (e.g., reduce the number of pixels to 25% of the number of pixels in the original image). For example, a group of pixels (e.g., a 2×2 group of pixels) in the higher resolution image may combined into a pixel in the lower resolution image. For example, an image may be captured at a lower resolution may include approximately 40,000 pixels (e.g., a 200×200 image). The combined pixel in the lower resolution image may have an intensity that is equal to an average intensity of the group of pixels in the higher resolution image.

If, at 932, the control circuit determines that the image is done being processed, or each resolution is done being processed, the control circuit may determine if any glare conditions were present in the image or images at 934. If glare conditions were not present, the procedure 900 may end. For example, if the control circuit determines that a glare condition is not present, the motorized window treatment may be in a fully open position. If, however, glare conditions are present, the control circuit may determine a critical glare condition (e.g., the lowest pixel in the image having a glare condition) at 936.

At 928, a critical glare condition may be determined based on one or more of the locations detected at the multiple resolutions and stored (e.g., at 922). The critical glare condition may represent a lowest pixel of the glare conditions detected at the multiple resolutions where a glare condition was detected (e.g., a glare condition that is closest to a fully closed position of a motorized window treatment). For example, the critical glare condition may be a glare condition that is closest to a bottom portion of the image (e.g., across each of the resolutions). Also or alternatively, the critical glare condition may be a glare condition that is closest to a top portion of the image (e.g., across each of the resolutions). When multiple glare conditions are present in the image, the control circuit may be configured to compare the locations of the respective glare conditions to determine a critical glare condition. Referring now to FIG. 8B, glare conditions may be detected at pixels 852, 854, and/or 856. For example, pixel 852 (e.g., the lowest pixel) may be determined to be the location of the critical glare condition (e.g., as the motorized window treatment associated with the image is fully closed at the bottom of the image and pixel 852 is the closest glare condition to the bottom of the image). Referring again to FIG. 9A, at 938, the control circuit may perform one or more actions to remove the glare condition. For example, the control circuit may transmit control instructions to a motorized window treatment to remove the glare condition. The actions performed at 938 may be similar to actions performed in procedures 400 (e.g., step 424), 500 (e.g., 524-528), 550 (e.g., 582-586), 700 (e.g., 714-720), and/or 750 (e.g., 762-770). For example, the control instructions may direct the motorized window treatment to position the shade over the glare source and prevent the glare condition inside the room.

Figure 9B:
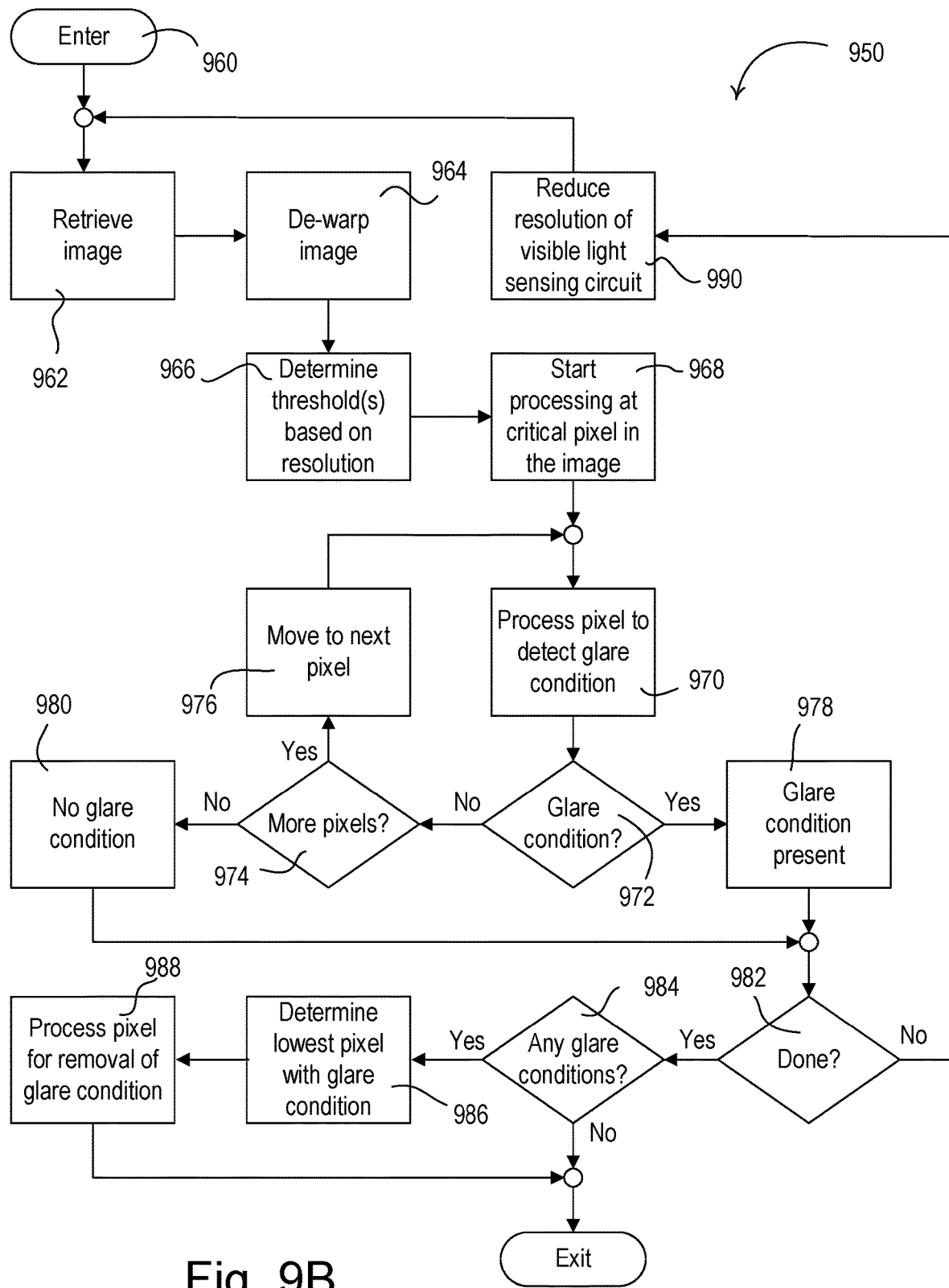

FIG. 9B shows a flowchart of another example glare detection procedure 950. The procedure 950 may be executed periodically by a control circuit of a visible light sensor (e.g., the control circuit 210 of the visible light sensor 200) and/or a system controller (e.g., system controller 110). The procedure 950 may begin at 960. At 962, the control circuit of the visible light sensor or the system controller may retrieve an image. For example, the image may be retrieved from: the image capturing circuit of the visible light sensor (e.g., the image capturing circuit 320), the memory of the visible light sensor (e.g., memory 312), and/or another device (e.g., system controller 110). The image may be captured at one or more resolutions. The image may be first captured at an initial resolution and subsequently captured at higher or lower resolutions. For example, the first resolution may be a highest resolution and any subsequent resolutions may be captured at lower resolutions. For example, a high resolution image may include approximately one million pixels (e.g., a one megapixel image or a 1280×1024 image), and a low resolution image may include approximately 40,000 pixels (e.g., a 200×200 image).

The device capturing the image (e.g., the image capturing circuit 320) may include a fisheye lens, which may cause the image captured to be curved and/or the perspective of the image to be distorted. Accordingly, at 964, the control circuit or the system controller may de-warp the image retrieved at 962, which may correct the curvature and/or perspective of the image. At 966, the control circuit of the visible light sensor or the system controller may determine one or more glare condition thresholds (e.g., an absolute glare condition threshold and/or a relative glare condition threshold) based on the resolution of the image. For example, when the resolution of the image is higher, in which the size of the individual pixels are smaller, the threshold may be higher. When the resolution is lower, in which the size of the individual pixels are larger, the threshold may be lower. For example, the threshold may be approximately 25,000 candelas per square meter for a high resolution image (e.g., a one megapixel image), and approximately 5,000 candelas per square meter for a low resolution image (e.g., a 200×200 image).

At 968, the control circuit of the visible light sensor or the system controller may begin processing a first pixel in the image. For example, the pixel may be located at a predetermined location in the image, such as a bottom portion (e.g., a bottom row of pixels) or top portion (e.g., a top row of pixels) of the image. The control circuit of the visible light sensor may begin processing the image at a pixel that is located at a bottom right-hand corner or a bottom left-hand corner of the image for shades that lower from and raise to a window treatment mounted at the top of the window. The control circuit of the visible light sensor may begin analyzing a pixel in the image that is located at a top right-hand corner or a top left-hand corner of the image for shades that raise from and lower to a motorized window treatment mounted at the bottom of the window. The direction of the analysis may depend on the location the motorized window treatment is mounted and/or the location at which a critical glare condition (e.g., a highest glare condition or a lowest glare condition) is expected to be detected for controlling the motorized window treatments to reduce processing resources for processing images.

At 970, the control circuit of the visible light sensor or the system controller may process the pixel to attempt to detect a glare condition. The image processing may be similar to (e.g., may include) the steps performed in the example procedures 400, 500, and/or 550. For example, the control circuit of the visible light sensor or system controller may determine a luminance of the pixel and compare the luminance to the threshold determined at 966. If, at 972, a glare condition is not present (e.g., the luminance of the pixel is less than the threshold determined at 966), the control circuit may determine if there are additional pixels to process at 974. If there are additional pixels to process, the control circuit may move to a next pixel at 976 and process the next pixel to attempt to detect a glare condition. The next pixel may be the next pixel in the row, or a first pixel in the next row of the image. If there are not additional pixels to process, the control circuit may determine that a glare condition is not present in the image at 980.

If, at 972, the control circuit detects a glare condition (e.g., the pixel's luminance is greater than the threshold determined at 966), the control circuit may track and/or store the location of the glare condition (e.g., the location of the pixel) at 978. The location of the glare condition may be used to determine a shade position and/or a critical glare condition. The critical glare condition may be the highest or lowest glare condition detected in the image. The critical glare condition may be the lowest glare condition in the image for shades that lower from and raise to a window treatment mounted at the top of the window. The critical glare condition may be the highest glare condition in the image for shades that raise from and lower to a motorized window treatment mounted at the bottom of the window.

At 982, the control circuit of the visible light sensor or system controller may determine whether the image is done being processed. For example, the control circuit may process the image multiple times (e.g., three times) at multiple resolutions to detect different glare conditions using different thresholds that correspond to each resolution. The processing of different resolution images may allow the control circuit to appropriately detect glare conditions due to small high-intensity glare sources and/or large low-intensity glare sources. For example, small glare sources may be more easily detected in a higher resolution image because there are more pixels in the image. Since glare conditions may be caused due to a small glare source having a high intensity, the threshold used to detect the glare conditions in a high resolution image (e.g., as determined at 966) may be higher (e.g., a higher pixel intensity may trigger the detection of a glare condition). The small glare sources may be less easily detected in a lower resolution images (e.g., the small glare sources may be removed from and/or filtered out of the lower resolution image), which may allow a large low intensity glare source to be detected. Since glare conditions may also be caused due to a large glare source having a low intensity, the threshold used to detect the glare conditions in a low resolution image (e.g., as determined at 966) may be lower (e.g., a lower pixel intensity may trigger the detection of a glare condition).

If the control circuit determines that the image is not done being processed (e.g., a predetermined number of resolutions have yet to be processed), the control circuit may reduce resolution of the visible light sensor (e.g., the image capturing circuit 320) at 990 prior to retrieving another image. As described herein, the visible light sensor may capture the image at different resolutions (e.g., at 962) and process the different resolutions separately. Reducing the resolution of an image may reduce the number of pixels (e.g., reduce the number of pixels to 25% of the number of pixels in the original image). For example, a group of pixels (e.g., a 2×2 group of pixels) in the higher resolution image may combined into a pixel in the lower resolution image. The combined pixel in the lower resolution image may have an intensity that is equal to an average intensity of the group of pixels in the higher resolution image.

If, at 982, the control circuit determines that the image is done being processed, or each resolution is done being processed, the control circuit may determine if any glare conditions were present in the image or images at 984. If glare conditions were not present, the procedure 950 may end. For example, if the control circuit determines that a glare condition is not present, the motorized window treatment may be in a fully open position. If, however, glare conditions are present, the control circuit may determine a critical glare condition (e.g., the lowest pixel in the image having a glare condition) at 986.

At 978, a critical glare condition may be determined based on one or more of the locations detected at the multiple resolutions and stored (e.g., at 972). The critical glare condition may represent a lowest pixel of the glare conditions detected at the multiple resolutions where a glare condition was detected (e.g., a glare condition that is closest to a fully closed position of a motorized window treatment). For example, the critical glare condition may be a glare condition that is closest to a bottom portion of the image (e.g., across all of the resolutions). Also or alternatively (e.g., across all of the resolutions), the critical glare condition may be a glare condition that is closest to a top portion of the image. When multiple glare conditions are present in the image, the control circuit may be configured to compare the locations of the respective glare conditions to determine a critical glare condition. Referring now to FIG. 8B, glare conditions may be detected at pixels 852, 854, and/or 856. For example, pixel 852 (e.g., the lowest pixel) may be determined to be the location of the critical glare condition (e.g., as the motorized window treatment associated with the image is fully closed at the bottom of the image and pixel 852 is the closest glare condition to the bottom of the image). Referring again to FIG. 9B, at 988, the control circuit may perform one or more actions to remove the glare condition. For example, the control circuit may transmit control instructions to a motorized window treatment to remove the glare condition. The actions performed at 988 may be similar to actions performed in procedures 400 (e.g., step 424), 500 (e.g., 524-528), 550 (e.g., 582-586), 700 (e.g., 714-720), and/or 750 (e.g., 762-770). For example, the control instructions may direct the motorized window treatment to position the shade over the glare source and prevent the glare condition inside the room.

Figure 10:
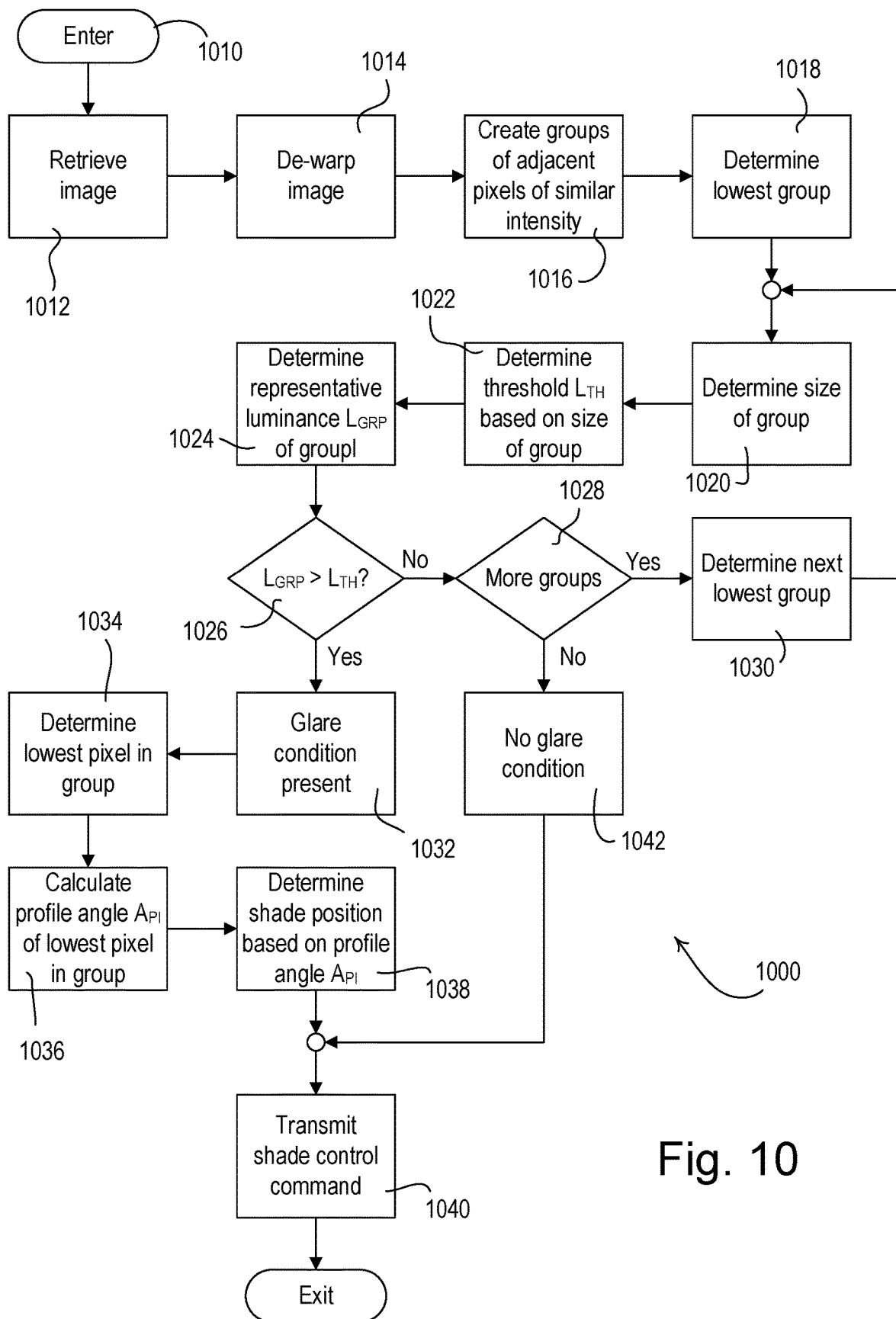
FIG. 10 shows a flowchart of an example procedure for grouping adjacent pixels and detecting glare conditions.

FIG. 10 shows a flowchart of another example glare detection procedure 1000. The procedure 1000 may be executed periodically by a control circuit of a visible light sensor (e.g., the control circuit 210 of the visible light sensor 200) or a system controller (e.g., system controller 110). The procedure 1000 may be performed in conjunction with the procedure 400, 500, 700, 750, 900, and/or 950.

As illustrated in FIG. 10, the procedure 1000 may begin at 1010. At 1012, the control circuit of the visible light sensor or the system controller may retrieve an image. For example, the image may be retrieved from: the image capturing circuit of the visible light sensor (e.g., the image capturing circuit 320), the memory of the visible light sensor (e.g., memory 312), and/or another device (e.g., system controller 110). The image may be captured and/or retrieved at one resolution (e.g., a high resolution). For example, the image may be captured at an initial resolution may be a high resolution image, which may include approximately one million pixels (e.g., a one megapixel image or a 1280×1024 image).

The device capturing the image (e.g., the image capturing circuit 320) may include a fisheye lens, which may cause the captured image to be curved and/or the perspective of the image to be distorted. Accordingly, at 1014, the control circuit of the visible light sensor or the system controller may de-warp the image retrieved at 1012. De-warping the image may correct the curvature and/or perspective of the image.

One or more neighboring pixels having similar intensities may be grouped together to form a group of pixels. Pixel groups may be dynamically sized and/or shaped. Dynamically shaped and/or dynamically sized pixel groups may provide improved glare detection (e.g., as group shapes are not limited to a square of a certain size). At 1016, the control circuit of the visible light sensor or the system controller may group one or more adjacent pixels having similar intensities (e.g., luminance). For example, when the control circuit of the visible light sensor or the system controller processes a pixel with a high intensity (e.g., luminance), the control circuit may look to group the surrounding pixels. Referring now to FIG. 8B, pixel 852 and its surrounding pixels may be grouped together (e.g., depending on whether a given surrounding pixel has a similar intensity). Similarly, pixel 856 and its surrounding pixels may be grouped together to form pixel group 858. Pixel 854, for example, may be a group of a single pixel (e.g., because the pixels surrounding pixel 808 do not have a similar intensity).

After the control circuit of the visible light sensor or the system controller groups surrounding pixels having similar intensities at 1016, the control circuit may determine the lowest group in the image at 1018. For example, the lowest group may be the group of pixels having one or more pixels closest to the bottom portion of the image (e.g., pixel 852 and its surrounding pixels as shown in FIG. 8B).

After the determining the lowest group in the image, the control circuit may determine the size of the group at 1020. The size of the group may be a function of the number of the pixels in the group, the shape of the group, and/or the size of the individual pixels in the group. The size of the group may be used to determine if the group of pixels present a glare condition. For example, the size of the group may be used to determine a group glare condition threshold.

Glare conditions may be caused to small high-intensity glare sources and/or large low-intensity glare sources. At 1022, the control circuit of the visible light sensor or the system controller may determine a group glare condition threshold based on the group size. For example, large groups may have a lower group glare condition threshold (e.g., to detect glare conditions due to large low-intensity glare sources), and small groups may have larger group glare condition thresholds (e.g., to detect glare conditions due to small high-intensity glare sources). For example, the pixel group 858 including pixel 856 may have the smallest group glare condition threshold, and the pixel group including pixel 854 may have the largest group glare condition of the pixel groups shown in FIG. 8B. Determining the group glare condition threshold based on the group size may allow for the control circuit of the visible light sensor to avoid the detection of pixels groups that do not present glare conditions, while continuing to detect pixel groups that present glare conditions (e.g., as the group size and/or threshold may be smaller).

At 1024, the control circuit may determine a representative group luminance. The representative group luminance may provide the control circuit of the visible light sensor a luminance value that represents the luminance values of the pixels in the group (e.g., each of the pixels in the group). Determining a representative group luminance for the pixels in the group may increase glare detection efficiency (e.g., because the control circuit may process the group using the representative group luminance, rather than processing luminance values for each pixel in the group). For example, the representative group luminance may be an average, mean, or median value of the luminance values of the pixels in the group. The representative group luminance may be the maximum or minimum value of the luminance values of the pixels in the group. The representative group luminance may be determined in multiple ways (e.g., in any way that represents an aggregate of the luminance of the pixels in the group).

The control circuit of the visible light sensor or the system controller may detect glare conditions in an efficient manner. The control circuit may begin processing groups of pixels in a location relative to the fully closed position of a motorized window treatment. For example, if a motorized window treatment is located at a top of the window and lowers a shade fabric towards the bottom of the window (e.g., to a fully closed position), the control circuit of the visible light sensor may begin detecting glare conditions from the lowest group of pixels. At 1026, the control circuit of the visible light sensor or the system controller may process the lowest group of pixels to detect a glare condition by comparing the representative group luminance and the group glare condition threshold. If the representative group luminance is greater than the group glare condition threshold, the control circuit of the visible light sensor or the system controller may determine that a glare condition is present at 1032. The control circuit may determine the lowest pixel in the group at 1034.

After determining the lowest pixel in the group, the control circuit may calculate a profile angle for the lowest pixel in the group at 1036. As described herein, the profile angle may determine where glare may occur inside the room based on the location of a detected glare condition. The control circuit may determine a shade position based on the profile angle at 1038. For example, determining the shade position based on the profile angle may allow the motorized window to cover the location where the glare condition is detected and/or may prevent glare inside the room. Steps 1036 and/or 1038 may be similar (e.g., may include) to steps 524 and/or 582 shown in FIG. 5. After determining the shade position, the control circuit may transmit a shade control command to a motorized window treatment at 1040. For example, the shade control command may move the motorized window treatment corresponding to a location of the lowest pixel in the group.

When a representative group luminance is greater than a group glare condition threshold, the control circuit of the visible light sensor may stop detecting glare conditions, which may improve the efficiency of glare detection (e.g., because the control circuit may stop processing the groups remaining in the image once a glare condition is detected). For example, if, at 1026, the representative group luminance is not greater than the group glare condition threshold, the control circuit of the visible light sensor or system controller may determine if there are additional groups in the image at 1028. If, at 1028 additional groups are in the image, the control circuit may determine the next lowest group in the image at 1030. Alternatively, if additional groups are not present in the image, the control circuit or system controller may determine that a glare condition is not present in the image at 1042 and may transmit a shade control command to a motorized window treatment at 1040. As described herein, if a glare condition is not present, the motorized window treatment may be moved to or remain in the fully open position.

Figure 11:
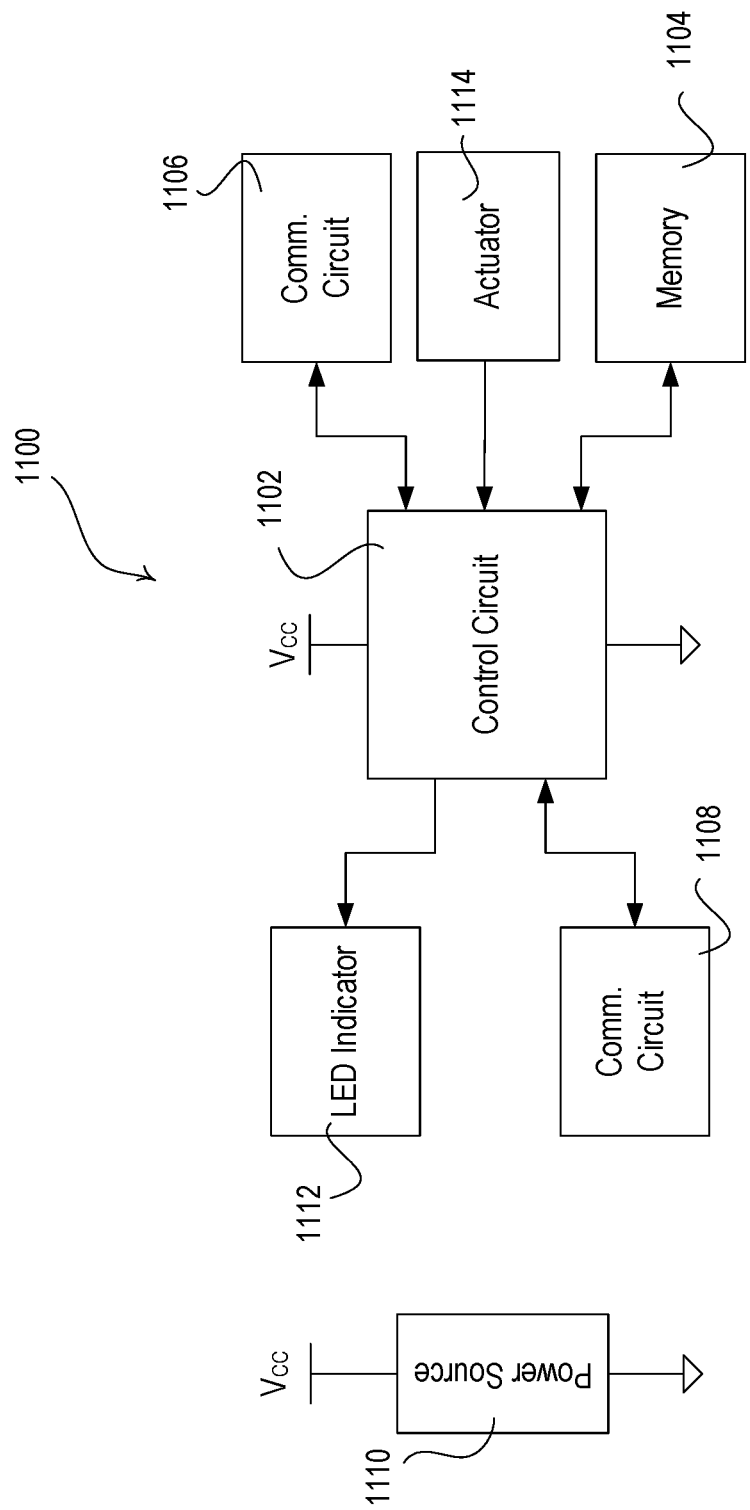
FIG. 11 is a block diagram of an example system controller.

FIG. 11 is a block diagram illustrating an example system controller 1100 (such as system controller 110, described herein). The system controller 1100 may include a control circuit 1102 for controlling the functionality of the system controller 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, image processing, power control, input/output processing, or any other functionality that enables the system controller 1100 to perform as described herein. The control circuit 1102 may store information in and/or retrieve information from the memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1100 may include a communications circuit 1106 for transmitting and/or receiving information. The communications circuit 1106 may perform wireless and/or wired communications. The system controller 1100 may also, or alternatively, include a communications circuit 1108 for transmitting and/or receiving information. The communications circuit 1106 may perform wireless and/or wired communications. Communications circuits 1106 and 1108 may be in communication with control circuit 1102. The communications circuits 1106 and 1108 may include RF transceivers or other communications modules capable of performing wireless communications via an antenna. The communications circuit 1106 and communications circuit 1108 may be capable of performing communications via the same communication channels or different communication channels. For example, the communications circuit 1106 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1108 may be capable of communicating (e.g., with control devices and/or other devices in the load control system) via another wireless communication channel (e.g., WI-FI® or a proprietary communication channel, such as CLEAR CONNECT™).

The control circuit 1102 may be in communication with an LED indicator 1112 for providing indications to a user. The control circuit 1102 may be in communication with an actuator 1114 (e.g., one or more buttons) that may be actuated by a user to communicate user selections to the control circuit 1102. For example, the actuator 1114 may be actuated to put the control circuit 1102 in an association mode and/or communicate association messages from the system controller 1100.

Each of the modules within the system controller 1100 may be powered by a power source 1110. The power source 1110 may include an AC power supply or DC power supply, for example. The power source 1110 may generate a supply voltage $V_{CC}$ for powering the modules within the system controller 1100.

Figure 12:
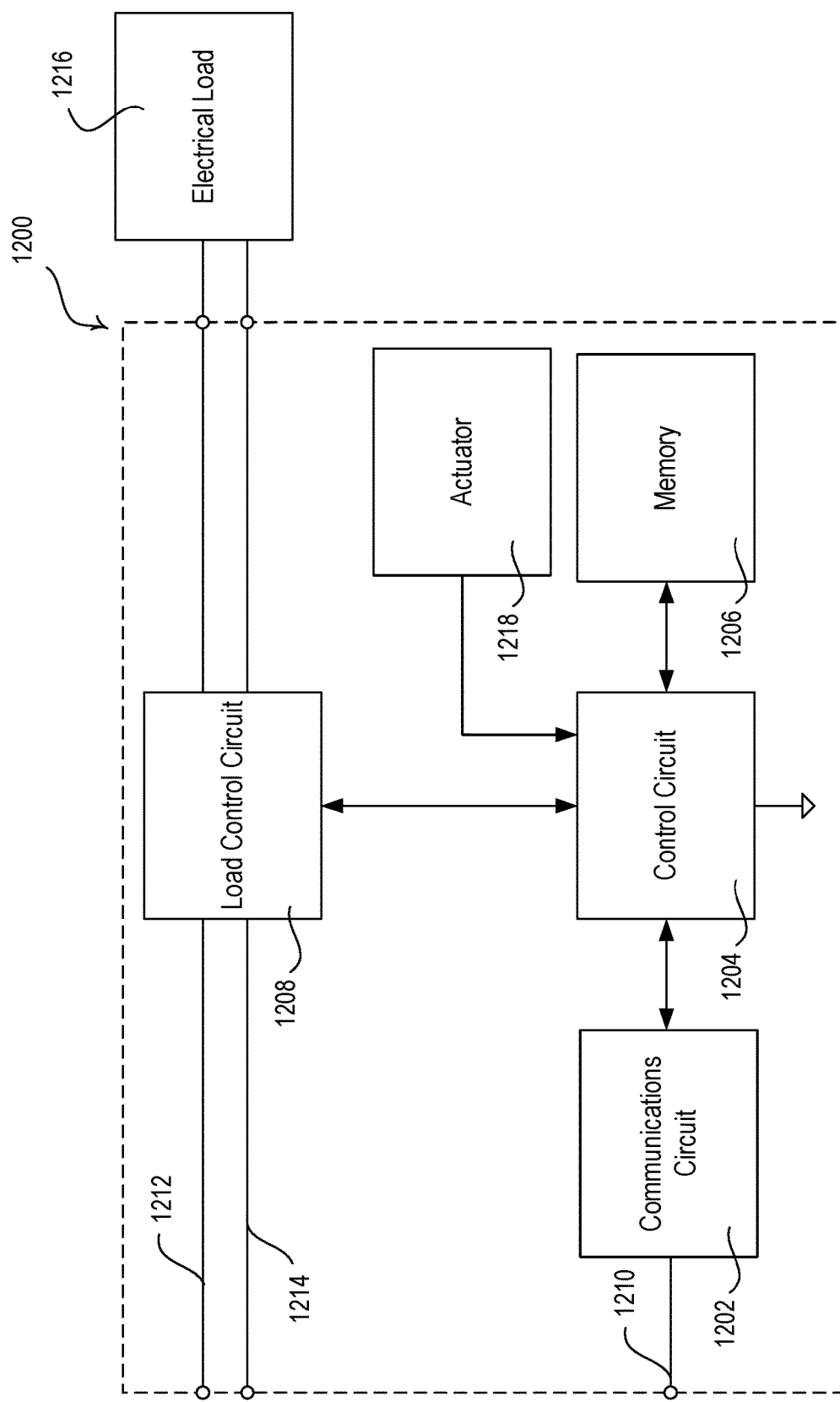
FIG. 12 is a block diagram of an example control-target device.

FIG. 12 is a block diagram illustrating an example control-target device, e.g., a load control device 1200, as described herein. The load control device 1200 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1200 may include a communications circuit 1202. The communications circuit 1202 may include a receiver, an RF transceiver, or other communications module capable of performing wired and/or wireless communications via communications link 1210. The communications circuit 1202 may be in communication with control circuit 1204. The control circuit 1204 may include one or more general purpose processors, special purpose processors, conventional processors, digital signal processors (DSPs), microprocessors, integrated circuits, a programmable logic device (PLD), application specific integrated circuits (ASICs), or the like. The control circuit 1204 may perform signal coding, data processing, power control, input/output processing, or any other functionality that enables the load control device 1200 to perform as described herein.

The control circuit 1204 may store information in and/or retrieve information from the memory 1206. For example, the memory 1206 may maintain a registry of associated control devices and/or control instructions. The memory 1206 may include a non-removable memory and/or a removable memory. The load control circuit 1208 may receive instructions from the control circuit 1204 and may control the electrical load 1216 based on the received instructions. For example, the electrical load 1216 may control a motorized window treatment (e.g., motorized window treatments 150). The load control circuit 1208 may send status feedback to the control circuit 1204 regarding the status of the electrical load 1216. The load control circuit 1208 may receive power via the hot connection 1212 and the neutral connection 1214 and may provide an amount of power to the electrical load 1216. The electrical load 1216 may include any type of electrical load.

The control circuit 1204 may be in communication with an actuator 1218 (e.g., one or more buttons) that may be actuated by a user to communicate user selections to the control circuit 1204. For example, the actuator 1218 may be actuated to put the control circuit 1204 in an association mode and/or communicate association messages from the load control device 1200.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

While the methods described herein are described with reference to controlling motorized window treatments (e.g., the motorized window treatments 150 and/or the motorized roller shade 220) for preventing glare conditions, the methods may be used to control other types of control devices to prevent and/or alleviate glare conditions. For example, the methods described herein could be used to control the transmittance of controllable electrochromic glass and/or to adjust the positions of indoor or outdoor controllable louvers to prevent and/or alleviate glare conditions.

What is claimed is:

1. An apparatus comprising:
a memory;
a control circuit configured to:
retrieve, from the memory, at least one image at a plurality of different resolutions;
process the at least one image at the plurality of different resolutions;
determine if a glare condition exists in the at least one image at each of the plurality of different resolutions, wherein the glare condition at each of the plurality of different resolutions is determined when a luminance value of a pixel in the at least one image exceeds a respective glare condition threshold for the resolution; and generate control instructions for controlling a shade position of a motorized window treatment to a position corresponding to a location of the glare condition detected at one of the plurality of different resolutions.

2. The apparatus of claim 1, wherein the control circuit is further configured to:

process the at least one image at a first resolution to detect a first glare condition;

determine a first glare condition threshold based on the first resolution;

determine a first location of the first glare condition in the at least one image at the first resolution based on the first glare condition threshold;

process the at least one image at a second resolution that is lower than the first resolution to detect a second glare condition;

determine a second glare condition threshold based on the second resolution;

determine a second location of the second glare condition in the at least one image at the second resolution based on the second glare condition threshold; and determine a lowest of the first and second glare conditions detected based on the respective location for each of the glare conditions.

3. The apparatus of claim 2, wherein the at least one image comprises a first plurality of pixels at the first resolution, and a second plurality of pixels at the second resolution.

4. The apparatus of claim 3, wherein the control circuit is further configured to:

process the at least one image at the first resolution by beginning to process the first plurality of pixels of the at least one image from a bottom towards a top of the at least one image until a luminance value of a processed pixel exceeds the first glare condition threshold; and process the at least one image at the second resolution by beginning to process the second plurality of pixels of the at least one image from a bottom towards a top of the at least one image until a luminance value of a processed pixel exceeds the second glare condition threshold.

5. The apparatus of claim 4, further comprising a memory, wherein the control circuit is configured to store a first location for the processed pixel that exceeds the first glare condition threshold in the memory, and to store a second location for the processed pixel that exceeds the second glare condition threshold in the memory.

6. The apparatus of claim 2, wherein the control circuit is further configured to:

retrieve a first image at the first resolution and process the first image to detect the first glare condition; and retrieve a second image at the second resolution and process the second image to detect the second glare condition.

7. The apparatus of claim 2, wherein the control circuit is further configured to:

retrieve a first image at the first resolution and process the first image to detect the first glare condition; and reduce the resolution of the first image to the second resolution and process a second image at the second resolution to detect the second glare condition.

8. The apparatus of claim 1, wherein the control circuit is further configured to process the at least one image at each resolution from a bottom row of pixels to a top row of pixels until a lowest glare condition for the resolution is detected, and wherein the lowest glare condition for each resolution of the at least one image comprises a first pixel having a luminance value that exceeds the glare condition threshold for the resolution.

9. The apparatus of claim 1, wherein the control circuit is further configured to:

retrieve the at least one image from a visible light sensing circuit; and de-warp the at least one image prior to processing.

10. The apparatus of claim 1, wherein the control circuit is further configured to convert the at least one image to the plurality of different resolutions.

11. The apparatus of claim 2, wherein the control circuit is further configured to determine a profile angle based on a location of the lowest of the first and second glare conditions, and wherein the shade position of the motorized window treatment is based on the profile angle.

12. The apparatus of claim 1, further comprising a communication circuit, wherein the communication circuit is configured to transmit the control instructions for controlling the shade position of the motorized window treatment.

13. The apparatus of claim 1, wherein the apparatus is a system controller configured to communicate with a sensor device, and wherein the system controller comprises a communication circuit configured to receive the at least one image from the sensor device.

14. A system controller for detecting a location of a glare condition and for controlling a shade position of a motorized window treatment, the system controller comprising:

a control circuit configured to:

organize one or more adjacent pixels in an image having a similar intensity into a group of pixels based on respective intensities of the one or more adjacent pixels, wherein the group of pixels comprises a group size and a representative group luminance;

determine a glare condition threshold for the group of pixels based on the group size;

detect a glare condition when the representative group luminance exceeds the group glare condition threshold; and generate control instructions for controlling the shade position of the motorized window treatment to a location corresponding to a lowest pixel in the group of pixels in response to detecting the glare condition.

15. The system controller of claim 14, wherein the representative group luminance comprises an average luminance of the one or more adjacent pixels.

16. The system controller of claim 14, wherein the representative group luminance comprises a luminance of a pixel, in the one or more adjacent pixels, having a highest luminance.

17. The system controller of claim 14, wherein the control circuit is further configured to determine a profile angle based on the location of the lowest pixel in the group of pixels, wherein the shade position of the motorized window treatment is based on the profile angle.

18. The system controller of claim 14, further comprising:

a communication circuit;

wherein the control circuit is further configured to transmit, via the communication circuit, the control instructions for controlling the shade position of the motorized window treatment.

19. A method comprising:
retrieving at least one image at a plurality of different resolutions;
processing the at least one image at the plurality of different resolutions;
determining if a glare condition exists in the at least one image at each of the plurality of different resolutions, wherein the glare condition at each of the plurality of different resolutions is determined when a luminance value of a pixel in the at least one image exceeds a respective glare condition threshold for the resolution; and
generating control instructions for controlling a shade position of a motorized window treatment to a position corresponding to a location of the glare condition detected at one of the plurality of different resolutions.

20. The method of claim 19, further comprising:
processing the at least one image at a first resolution to detect a first glare condition;
determining a first glare condition threshold based on the first resolution;
determining a first location of the first glare condition in the at least one image at the first resolution based on the first glare condition threshold;
processing the at least one image at a second resolution that is lower than the first resolution to detect a second glare condition;
determining a second glare condition threshold based on the second resolution;
determining a second location of the second glare condition in the at least one image at the second resolution based on the second glare condition threshold; and
determining a lowest of the first and second glare conditions detected based on the respective location for each of the glare conditions.

21. The method of claim 20, wherein the at least one image comprises a first plurality of pixels at the first resolution, and a second plurality of pixels at the second resolution; and wherein the method further comprises:
processing the at least one image at the first resolution by beginning to process the first plurality of pixels of the at least one image from a bottom towards a top of the at least one image until a luminance value of a processed pixel exceeds the first glare condition threshold; and
processing the at least one image at the second resolution by beginning to process the second plurality of pixels of the at least one image from a bottom towards a top of the at least one image until a luminance value of a processed pixel exceeds the second glare condition threshold.

22. The method of claim 21, further comprising:
storing a first location for the processed pixel that exceeds the first glare condition threshold in a memory; and
storing a second location for the processed pixel that exceeds the second glare condition threshold in the memory.

23. The method of claim 20, further comprising:
retrieving a first image at the first resolution and processing the first image to detect the first glare condition; and
retrieving a second image at the second resolution and processing the second image to detect the second glare condition.

24. The method of claim 20, further comprising:
retrieving a first image at the first resolution and processing the first image to detect the first glare condition; and
reducing the resolution of the first image to the second resolution and processing a second image at the second resolution to detect the second glare condition.

25. The method of claim 19, further comprising processing the at least one image at each resolution from a bottom row of pixels to a top row of pixels until a lowest glare condition for the resolution is detected, and wherein the lowest glare condition for each resolution of the at least one image comprises a first pixel having a luminance value that exceeds the glare condition threshold for the resolution.

26. The method of claim 19, further comprising:
retrieving the at least one image from a visible light sensing circuit; and
de-warping the at least one image prior to processing.

27. The method of claim 20, further comprising determining a profile angle based on a location of the lowest of the first and second glare conditions, and wherein the shade position of the motorized window treatment is based on the profile angle.

28. The method of claim 19, further comprising transmitting the control instructions for controlling the shade position of the motorized window treatment.

29. A method for detecting a location of a glare condition and for controlling a shade position of a motorized window treatment, the method comprising:
retrieving an image;
organizing one or more adjacent pixels in the image having a similar intensity into a group of pixels based on respective intensities of the one or more adjacent pixels, wherein the group of pixels comprises a group size and a representative group luminance;
determining a glare condition threshold for the group of pixels based on the group size;
detecting a glare condition when the representative group luminance exceeds the group glare condition threshold; and
generating control instructions for controlling the shade position of the motorized window treatment to a location corresponding to a lowest pixel in the group of pixels in response to detecting the glare condition.

30. The method of claim 29, wherein the representative group luminance comprises an average luminance of the one or more adjacent pixels.

31. The method of claim 29, wherein the representative group luminance comprises a luminance of a pixel, in the one or more adjacent pixels, having a highest luminance.

32. The method of claim 29, wherein the group glare condition threshold is directly proportional to the group size.

33. The method of claim 29, further comprising determining a profile angle based on the location of the lowest pixel in the group of pixels, wherein the shade position of the motorized window treatment is based on the profile angle.

34. The method of claim 29, further comprising transmitting the control instructions for controlling the shade position of the motorized window treatment.

35. At least one non-transitory computer readable medium comprising executable instructions stored thereon that, when executed by at least one control circuit, cause the at least one control circuit to:
retrieve at least one image at a plurality of different resolutions;
process the at least one image at the plurality of different resolutions;
determine if a glare condition exists in the at least one image at each of the plurality of different resolutions, wherein the glare condition at each of the plurality of different resolutions is determined when a luminance value of a pixel in the at least one image exceeds a respective glare condition threshold for the resolution; and generate control instructions for controlling a shade position of a motorized window treatment to a position corresponding to a location of the glare condition detected at one of the plurality of different resolutions.

36. The at least one non-transitory computer readable medium of claim 35, wherein the instructions, when executed, further cause the at least one control circuit to:
process the at least one image at a first resolution to detect a first glare condition;
determine a first glare condition threshold based on the first resolution;
determine a first location of the first glare condition in the at least one image at the first resolution based on the first glare condition threshold;
process the at least one image at a second resolution that is lower than the first resolution to detect a second glare condition;
determine a second glare condition threshold based on the second resolution;
determine a second location of the second glare condition in the at least one image at the second resolution based on the second glare condition threshold; and
determine a lowest of the first and second glare conditions detected based on the respective location for each of the glare conditions.

37. The at least one non-transitory computer readable medium of claim 36, wherein the at least one image comprises a first plurality of pixels at the first resolution, and a second plurality of pixels at the second resolution.

38. The at least one non-transitory computer readable medium of claim 37, wherein the instructions, when executed, further cause the at least one control circuit to:
process the at least one image at the first resolution by beginning to process the first plurality of pixels of the at least one image from a bottom towards a top of the at least one image until a luminance value of a processed pixel exceeds the first glare condition threshold; and
process the at least one image at the second resolution by beginning to process the second plurality of pixels of the at least one image from a bottom towards a top of the at least one image until a luminance value of a processed pixel exceeds the second glare condition threshold.

39. The at least one non-transitory computer readable medium of claim 38, wherein the instructions, when executed, further cause the at least one control circuit to store a first location for the processed pixel that exceeds the first glare condition threshold, and to store a second location for the processed pixel that exceeds the second glare condition threshold.

40. The at least one non-transitory computer readable medium of claim 36, wherein the instructions, when executed, further cause the at least one control circuit to:
retrieve a first image at the first resolution and process the first image to detect the first glare condition; and
retrieve a second image at the second resolution and process the second image to detect the second glare condition.

41. The at least one non-transitory computer readable medium of claim 36, wherein the instructions, when executed, further cause the at least one control circuit to:
retrieve a first image at the first resolution and process the first image to detect the first glare condition; and
reduce the resolution of the first image to the second resolution and process a second image at the second resolution to detect the second glare condition.

42. The at least one non-transitory computer readable medium of claim 35, wherein the instructions, when executed, further cause the at least one control circuit to process the at least one image at each resolution from a bottom row of pixels to a top row of pixels until a lowest glare condition for the resolution is detected, and wherein the lowest glare condition for each resolution of the at least one image comprises a first pixel having a luminance value that exceeds the glare condition threshold for the resolution.

43. The at least one non-transitory computer readable medium of claim 35, wherein the instructions, when executed, further cause the at least one control circuit to:
retrieve the at least one image; and
de-warp the at least one image prior to processing.

44. The at least one non-transitory computer readable medium of claim 35, wherein the instructions, when executed, further cause the at least one control circuit to convert the at least one image to the plurality of different resolutions.

45. The at least one non-transitory computer readable medium of claim 36, wherein the instructions, when executed, further cause the at least one control circuit to determine a profile angle based on a location of the lowest of the first and second glare conditions, and wherein the shade position of the motorized window treatment is based on the profile angle.

46. The at least one non-transitory computer readable medium of claim 35, wherein the instructions, when executed, further cause the at least one control circuit to transmit the control instructions for controlling the shade position of the motorized window treatment.

47. At least one non-transitory computer readable medium comprising executable instructions stored thereon that, when executed by at least one control circuit, cause the at least one control circuit to:
retrieve an image;
organize one or more adjacent pixels in an image having a similar intensity into a group of pixels based on respective intensities of the one or more adjacent pixels, wherein the group of pixels comprises a group size and a representative group luminance;
determine a glare condition threshold for the group of pixels based on the group size;
detect a glare condition when the representative group luminance exceeds the group glare condition threshold; and
generate control instructions for controlling a shade position of a motorized window treatment to a location corresponding to a lowest pixel in the group of pixels in response to detecting the glare condition.

48. The at least one non-transitory computer readable medium of claim 47, wherein the representative group luminance comprises an average luminance of the one or more adjacent pixels.

49. The at least one non-transitory computer readable medium of claim 47, wherein the representative group luminance comprises a luminance of a pixel, in the one or more adjacent pixels, having a highest luminance.

50. The at least one non-transitory computer readable medium of claim 47, wherein the instructions, when executed, further cause the at least one control circuit to determine a profile angle based on the location of the lowest pixel in the group of pixels, wherein a shade position of a motorized window treatment is based on the profile angle.

51. The at least one non-transitory computer readable medium of claim 47, wherein the instructions, when executed, further cause the at least one control circuit to transmit the control instructions for controlling a shade position of a motorized window treatment.

\* \* \* \* \*